(12) United States Patent
Saiga et al.

(10) Patent No.: US 11,762,174 B2
(45) Date of Patent: Sep. 19, 2023

(54) OPTICAL SYSTEM INCLUDING LENSES AND PRISM FOR TELEPHOTO CAMERAS

(71) Applicant: Apple Inc., Cupertino, CA (US)

(72) Inventors: Takeyoshi Saiga, Tokyo (JP); Yoshikazu Shinohara, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/481,213

(22) Filed: Sep. 21, 2021

(65) Prior Publication Data

US 2022/0091373 A1    Mar. 24, 2022

Related U.S. Application Data

(60) Provisional application No. 63/083,038, filed on Sep. 24, 2020.

(51) Int. Cl.
| | |
|---|---|
| *G02B 13/00* | (2006.01) |
| *G02B 13/02* | (2006.01) |
| *H04N 23/55* | (2023.01) |

(52) U.S. Cl.
CPC ......... *G02B 13/007* (2013.01); *G02B 13/002* (2013.01); *G02B 13/02* (2013.01); *H04N 23/55* (2023.01)

(58) Field of Classification Search
CPC .... G02B 13/007; G02B 13/002; G02B 13/02; G02B 5/005; G02B 13/004; G02B 13/0065; G02B 13/0035; G02B 13/22; H04N 5/2254; H04N 23/55; G03B 17/17
See application file for complete search history.

(56) References Cited

U.S. PATENT DOCUMENTS

| | | | | |
|---|---|---|---|---|
| 6,084,715 | A * | 7/2000 | Aoki | G02B 23/243 359/627 |
| 6,337,776 | B1 | 1/2002 | Kamo et al. | |
| 8,462,447 | B2 * | 6/2013 | Park | G02B 13/004 359/708 |
| 10,467,469 | B2 * | 11/2019 | Goncharov | G06V 40/172 |
| 2003/0020006 | A1 | 1/2003 | Janeczko et al. | |
| 2006/0092524 | A1 | 5/2006 | Konno | |
| 2014/0239206 | A1 * | 8/2014 | Namii | G03B 35/08 250/558 |
| 2017/0336543 | A1 | 11/2017 | Spring et al. | |

(Continued)

OTHER PUBLICATIONS

International Search Report and Written Opinion dated Jan. 7, 2022 in International Application No. PCT/US2021/051574, pp. 1-12.

*Primary Examiner* — Luong T Nguyen
(74) *Attorney, Agent, or Firm* — Robert C. Kowert; Kowert, Hood, Munyon, Rankin & Goetzel, P.C.

(57) ABSTRACT

An optical system for a camera may include a lens group having a plurality of lenses, a prism, and an image sensor. The prism may be positioned, optically, between the plurality of lenses and the image sensor along the optical transmitting path of the light. The prism may include at least four surfaces, which may fold the light within the prism at least four times to guide the light from the plurality of lenses passing through the prism to the image sensor. The prism may include multiple prisms joined together using an optical cement. The prism may include one or more aperture masks inside the prism to reduce flare.

19 Claims, 25 Drawing Sheets

(56) References Cited

U.S. PATENT DOCUMENTS

2019/0025603 A1\* 1/2019 Hudgins ................. G02B 30/26
2020/0064594 A1\* 2/2020 Jeong ....................... G02B 9/64
2020/0271585 A1\* 8/2020 Sasaki ................ G01N 15/1459

\* cited by examiner

Table 2A. Example Values of Parameters for an Optical System

| | | Optical System 100 in FIG. 1 |
|---|---|---|
| Semi-sensor diagnal | mm | 2.822 |
| Effective focal length (EFL) | mm | 17 |
| F-number (Fno) | - | 2.8 |
| Total Z-height or A | mm | 8.90 |
| Partial Z-height or B | mm | 4.08 |
| Ratio of (partial Z-height / total Z-height) or B/A | $0.2 < B/A < 0.6$ | 0.46 |
| Optical path length in a prism or C | mm | 14.5 |
| Power of lens group or D | 1/mm | 0.06 |
| Production of (optical path length in a prism x power of lens group) or CD | $0.6 < CD < 1.0$ | 0.853 |
| Thickness of a prism or E | mm | 2.58 |
| Thickness of a lens group or F | mm | 4.82 |
| Ratio of (thickness of a prism / thickness of a lens group) or E/F | $0.2 < E/F < 0.8$ | 0.54 |
| Angle θ between a first and second surfaces of a prism | $25 < θ < 35$ | 31 |

FIG. 2A

Table 2B. Example Values of Additional Parameters for Optical System 100

- all surface positons based on L1S1 global coordinate

| | y | z | angle (α) |
|---|---|---|---|
| aperture stop | 0 | 0.8 | 0 |
| L1S1 | 0.000 | 0.000 | 0 |
| L1S2 | 0.000 | 1.840 | 0 |
| L2S1 | 0.000 | 1.940 | 0 |
| L2S2 | 0.000 | 3.003 | 0 |
| L3S1 | 0.000 | 3.176 | 0 |
| L3S2 | 0.000 | 3.596 | 0 |
| PrismS1 | 0.000 | 4.819 | 0 |
| prismS2 | 0.000 | 6.204 | -31 |
| PrismS3 | -7.461 | 7.401 | 0 |
| prismS4 | -10.264 | 5.910 | -31 |
| IFS1 | -10.264 | 8.591 | 0 |
| IFS2 | -10.264 | 8.801 | 0 |
| image plane (INF) | -10.264 | 8.901 | 0 |

- coefficient of each surface

| | L1S1 | L1S2 | | |
|---|---|---|---|---|
| Radius of curvature | 5.250791788 | Infinity ( flat surface) | | |

| | L2S1 | L2S2 | L3S1 | L3S2 |
|---|---|---|---|---|
| Radius of curvature | 5.47000E+00 | 5.30245E+00 | 2.26521E+00 | 1.75663E+00 |
| k (conic) | 2.10739E+00 | 1.19388E+00 | -9.81768E-01 | -8.58607E-01 |
| 4th order | 2.88805E-03 | 1.48817E-02 | -6.77968E-03 | -1.97453E-02 |
| 6th order | -2.94746E-04 | -2.72790E-03 | -2.03239E-03 | -6.71721E-05 |
| 8th order | -1.54367E-05 | 6.62624E-04 | 5.71758E-04 | 3.76499E-04 |
| 10th order | 1.10340E-05 | -3.76326E-05 | 7.92107E-06 | -7.58473E-05 |
| 12th order | -2.21351E-06 | -8.15074E-06 | -2.73733E-05 | 1.37303E-06 |
| 14th order | 1.80725E-07 | 1.71759E-06 | 4.10910E-06 | -3.93694E-07 |
| 16th order | -7.61741E-09 | -1.34393E-07 | -2.33688E-07 | 9.83202E-08 |

- material

| | L1 | L2 | L3 | Prism |
|---|---|---|---|---|
| Refractive index (Nd) | 1.439 | 1.567 | 1.687 | 1.658 |
| Abbe number (Vd) | 94.9 | 37.4 | 18.3 | 50.9 |
| material | Glass | Plastic | Plastic | Glass |

FIG. 2B

Table 5. Example Values of Parameters for Example Optical Systems

| | | Optical System 400a in FIG. 4A | Optical System 400b in FIG. 4B | Optical System 400c in FIG. 4C | Optical System 400d in FIG. 4D | Optical System 400e in FIG. 4E | Optical System 400f in FIG. 4F | Optical System 400g in FIG. 4G | Optical System 400h in FIG. 4H |
|---|---|---|---|---|---|---|---|---|---|
| Semi-sensor diagnal | mm | 2.822 | 3.528 | 3.528 | 3.528 | 2.52 | 2.52 | 2.822 | 2.822 | 2.52 |
| Effective focal length (EFL) | mm | 17 | 17 | 17 | 17 | 15.18 | 15.18 | 27.2 | 17 | 15.3 |
| F-number (Fno) | - | 2.8 | 2.8 | 2.8 | 2.8 | 2.5 | 2.8 | 2.8 | 2.8 | 2.2 |
| Total Z-height or A | mm | 8.99 | 8.99 | 8.99 | 8.99 | 8.85 | 8.28 | 12.60 | 9.90 | 9.90 |
| Partial Z-height or B | mm | 3.99 | 3.99 | 3.99 | 3.99 | 3.57 | 3.73 | 5.60 | 4.40 | 4.30 |
| Ratio of (partial Z-height / total Z-height) or B/A | 0.2 <B/A < 0.6 | 0.44 | 0.44 | 0.44 | 0.44 | 0.40 | 0.45 | 0.44 | 0.44 | 0.43 |
| Optical path length in a prism or C | mm | 14 | 14 | 14 | 14 | 11.6 | 12.5 | 23 | 14.5 | 14 |
| Power of lens group or D | 1/mm | 0.06 | 0.06 | 0.06 | 0.06 | 0.07 | 0.07 | 0.04 | 0.06 | 0.07 |
| Production of (optical path length in a prism x power of lens group) or CD | 0.6 < CD < 1.0 | 0.824 | 0.824 | 0.824 | 0.824 | 0.764 | 0.823 | 0.846 | 0.853 | 0.915 |
| Thickness of a prism or E | mm | 2.49 | 2.49 | 2.49 | 2.49 | 2.07 | 2.23 | 4.10 | 2.90 | 2.80 |
| Thickness of a lens group or F | mm | 5.00 | 5.00 | 5.00 | 5.00 | 5.28 | 4.56 | 7.00 | 5.50 | 5.60 |
| Ratio of (thickness of a prism / thickness of a lens group) or E/F | 0.2 < E/F < 0.8 | 0.50 | 0.50 | 0.50 | 0.50 | 0.39 | 0.49 | 0.59 | 0.53 | 0.50 |
| Angle θ between a first and second surfaces of a prism | 25< θ <35 | 31 | 31 | 31 | 31 | 31 | 31 | 31 | 30 | 30 |

FIG. 5

Table 6A. Example Values for Parameters of Optical Systems 400a

- all surface positons based on L1S1 global coordinate

| | x | z | angle (o) |
|---|---|---|---|
| aperture stop | 0 | 0.5 | 0 |
| L1S1 | 0.000 | 0.000 | 0 |
| L1S2 | 0.000 | 1.217 | 0 |
| L2S1 | 0.000 | 1.317 | 0 |
| L2S2 | 0.000 | 2.124 | 0 |
| L3S1 | 0.000 | 2.224 | 0 |
| L3S2 | 0.000 | 2.724 | 0 |
| L4S1 | 0.000 | 3.981 | 0 |
| L4S2 | 0.000 | 4.411 | 0 |
| PrismS1 | 0.000 | 5.000 | 0 |
| prismS2 | 0.000 | 6.337 | -31 |
| PrismS3 | -7.204 | 7.493 | 0 |
| prismS4 | -9.910 | 6.054 | -31 |
| IFS1 | -9.910 | 8.683 | 0 |
| IFS2 | -9.910 | 8.893 | 0 |
| image plane (INF) | -9.910 | 8.993 | 0 |

- coefficient of each surface

| | L1S1 | L1S2 |
|---|---|---|
| Radius of curvature | 9.229105334 | -88.64429274 |

| | L2S1 | L2S2 | L3S1 | L3S2 | L4S1 | L4S2 |
|---|---|---|---|---|---|---|
| Radius of curvature | 5.09103E+00 | 7.40605E+00 | 2.86839E+00 | 2.15603E+00 | -7.52895E+00 | -1.02139E+01 |
| k (conic) | 2.49644E-01 | -2.70246E+00 | -2.65394E-01 | -9.75044E-01 | -3.32194E-01 | 4.12865E+00 |
| 4th order | 3.12257E-03 | 9.30513E-03 | -9.50738E-03 | -1.04872E-02 | 1.40896E-02 | 1.35725E-02 |
| 6th order | 3.59234E-05 | -3.88111E-04 | 4.57899E-04 | 1.73999E-03 | -3.61649E-05 | 7.40702E-05 |
| 8th order | 5.50710E-06 | 3.65387E-05 | -2.77810E-04 | -5.04735E-04 | 8.23825E-06 | -1.68060E-05 |
| 10th order | 3.77868E-06 | -2.13530E-05 | 9.36120E-06 | 6.69988E-05 | 4.28767E-05 | 4.79212E-05 |
| 12th order | -1.58623E-06 | 4.60089E-06 | 1.46161E-06 | -3.52375E-07 | -1.16980E-05 | -1.40356E-05 |
| 14th order | 2.56854E-07 | -3.39217E-07 | 1.72882E-07 | -7.87862E-07 | 7.87026E-07 | 1.32383E-06 |
| 16th order | -1.42828E-08 | 3.47992E-09 | -2.42629E-08 | 7.90837E-08 | -2.05858E-09 | -4.57067E-08 |

- material

| | L1 | L2 | L3 | L4 | Prism |
|---|---|---|---|---|---|
| Nd | 1.595 | 1.544 | 1.616 | 1.687 | 1.535 |
| Vd | 67.7 | 55.9 | 25.8 | 18.3 | 55.7 |
| material | Glass | Plastic | Plastic | Plastic | Plastic |

FIG. 6A

*Table 6B. Example Values for Parameters of Optical Systems 400b*

• all surface positons based on L1S1 global coordinate

| | x | z | angle (α) |
|---|---|---|---|
| aperture stop | 0 | 0.5 | 0 |
| L1S1 | 0.000 | 0.000 | 0 |
| L1S2 | 0.000 | 1.217 | 0 |
| L2S1 | 0.000 | 1.317 | 0 |
| L2S2 | 0.000 | 2.124 | 0 |
| L3S1 | 0.000 | 2.224 | 0 |
| L3S2 | 0.000 | 2.724 | 0 |
| L4S1 | 0.000 | 3.981 | 0 |
| L4S2 | 0.000 | 4.411 | 0 |
| PrismS1 | 0.000 | 5.000 | 0 |
| prismS2 | 0.000 | 6.337 | -31 |
| PrismS3 | -7.204 | 7.493 | 0 |
| prismS4 | -9.910 | 6.054 | -31 |
| IFS1 | -9.910 | 8.683 | 0 |
| IFS2 | -9.910 | 8.893 | 0 |
| image plane (INF) | -9.910 | 8.993 | 0 |

• coefficient of each surface

| | L1S1 | L1S2 |
|---|---|---|
| Radius of curvature | 9.229105334 | -88.64429274 |

| | L2S1 | L2S2 | L3S1 | L3S2 | L4S1 | L4S2 |
|---|---|---|---|---|---|---|
| Radius of curvature | 5.09103E+00 | 7.40605E+00 | 2.86839E+00 | 2.15603E+00 | -7.52895E+00 | -1.02139E+01 |
| k (conic) | 2.49644E-01 | -2.70246E+00 | -2.65394E-01 | -9.75044E-01 | -3.32194E-01 | 4.12865E+00 |
| 4th order | 3.12257E-03 | 9.30513E-03 | -9.50738E-03 | -1.04872E-02 | 1.40896E-02 | 1.35725E-02 |
| 6th order | 3.59234E-05 | -3.88111E-04 | 4.57899E-04 | 1.73999E-03 | -3.61649E-05 | 7.40702E-05 |
| 8th order | 5.50710E-06 | 3.65387E-05 | -2.77810E-04 | -5.04735E-04 | 8.23825E-06 | -1.68060E-05 |
| 10th order | 3.77868E-06 | -2.13530E-05 | 9.36120E-06 | 6.69988E-05 | 4.28767E-05 | 4.79212E-05 |
| 12th order | -1.58623E-06 | 4.60089E-06 | 1.46161E-06 | -3.52375E-07 | -1.16980E-05 | -1.40356E-05 |
| 14th order | 2.56854E-07 | -3.39217E-07 | 1.72882E-07 | -7.87862E-07 | 7.87026E-07 | 1.32383E-06 |
| 16th order | -1.42828E-08 | 3.47992E-09 | -2.42629E-08 | 7.90837E-08 | -2.05858E-08 | -4.57067E-08 |

• material

| | L1 | L2 | L3 | L4 | Prism |
|---|---|---|---|---|---|
| Nd | 1.595 | 1.544 | 1.616 | 1.687 | 1.535 |
| Vd | 67.7 | 55.9 | 25.8 | 18.3 | 55.7 |
| material | Glass | Plastic | Plastic | Plastic | Plastic |

*FIG. 6B*

Table 6C. Example Values for Parameters of Optical Systems 400c

- all surface positons based on L1S1 global coordinate

|  | x | z | angle (α) |
|---|---|---|---|
| aperture stop | 0 | 0.55 | 0 |
| L1S1 | 0.000 | 0.000 | 0 |
| L1S2 | 0.000 | 1.295 | 0 |
| L2S1 | 0.000 | 1.395 | 0 |
| L2S2 | 0.000 | 2.136 | 0 |
| L3S1 | 0.000 | 2.236 | 0 |
| L3S2 | 0.000 | 2.761 | 0 |
| L4S1 | 0.000 | 4.240 | 0 |
| L4S2 | 0.000 | 4.670 | 0 |
| PrismS1 | 0.000 | 5.000 | 0 |
| prismS2 | 0.000 | 6.337 | -31 |
| PrismS3 | -7.204 | 7.493 | 0 |
| prismS4 | -9.910 | 6.054 | -31 |
| IFS1 | -9.910 | 8.683 | 0 |
| IFS2 | -9.910 | 8.893 | 0 |
| image plane (INF) | -9.910 | 8.993 | 0 |

- coefficient of each surface

|  | L1S1 | L1S2 |
|---|---|---|
| Radius of curvature | 7.773841350 | -218.1180248 |

|  | L2S1 | L2S2 | L3S1 | L3S2 | L4S1 | L4S2 |
|---|---|---|---|---|---|---|
| Radius of curvature | 5.31226E+00 | 7.81214E+00 | 3.18109E+00 | 2.19930E+00 | -5.41704E+00 | -6.19580E+00 |
| k (conic) | 4.43177E-01 | -1.79201E+00 | -7.35151E-01 | -1.09976E+00 | -2.20602E+00 | -2.10754E+00 |
| 4th order | 2.25241E-03 | 9.29676E-03 | -5.19001E-03 | -7.75958E-03 | 9.46311E-03 | 8.65393E-03 |
| 6th order | 2.41928E-05 | -1.22122E-03 | -7.67195E-05 | 1.75876E-03 | 5.83490E-04 | 4.20405E-04 |
| 8th order | 1.97779E-06 | 2.52305E-04 | -2.26990E-05 | -4.11292E-04 | -1.55330E-04 | -1.06119E-04 |
| 10th order | 4.50526E-07 | -4.09914E-05 | -1.11552E-05 | 5.45061E-05 | 5.48421E-05 | 3.39202E-05 |
| 12th order | -3.23086E-07 | 2.90812E-06 | 1.29722E-06 | -1.34341E-06 | -6.84788E-06 | -3.72859E-06 |
| 14th order | 8.04324E-08 | 1.57954E-07 | 1.07089E-07 | -3.56269E-07 | 2.20148E-07 | -1.36210E-08 |
| 16th order | -4.91895E-09 | -2.45791E-08 | -1.40776E-08 | 3.16004E-08 | 9.61908E-09 | 1.62889E-08 |

- material

|  | L1 | L2 | L3 | L4 | Prism |
|---|---|---|---|---|---|
| Nd | 1.595 | 1.544 | 1.616 | 1.671 | 1.516 |
| Vd | 67.7 | 55.9 | 25.8 | 19.2 | 64.1 |
| material | Glass | Plastic | Plastic | Plastic | Glass |

FIG. 6C

Table 6D. Example Values for Parameters of Optical Systems 400d

- all surface positons based on L1S1 global coordinate

| | x | z | angle (α) |
|---|---|---|---|
| aperture stop | 0 | 0.8 | 0 |
| L1S1 | 0.000 | 0.000 | 0 |
| L1S2 | 0.000 | 2.182 | 0 |
| L2S1 | 0.000 | 2.282 | 0 |
| L2S2 | 0.000 | 3.196 | 0 |
| L3S1 | 0.000 | 3.813 | 0 |
| L3S2 | 0.000 | 4.233 | 0 |
| PrismS1 | 0.000 | 5.283 | 0 |
| prismS2 | 0.000 | 6.391 | -31 |
| PrismS3 | -5.969 | 7.349 | 0 |
| prismS4 | -8.211 | 6.157 | -31 |
| IFS1 | -8.211 | 8.539 | 0 |
| IFS2 | -8.211 | 8.749 | 0 |
| image plane (INF) | -8.211 | 8.849 | 0 |

- coefficient of each surface

| | L1S1 | L1S2 |
|---|---|---|
| Radius of curvature | 4.917333526 | 71.40763126 |

| | L2S1 | L2S2 | L3S1 | L3S2 |
|---|---|---|---|---|
| Radius of curvature | 4.39665E+00 | 4.14091E+00 | 3.27557E+00 | 2.30496E+00 |
| k (conic) | -2.83226E-01 | 3.82276E-01 | -4.21929E-01 | -6.31574E-01 |
| 4th order | 3.86908E-03 | 1.09550E-02 | -2.31967E-03 | -6.67500E-03 |
| 6th order | 1.29916E-04 | -6.67332E-04 | -3.47788E-03 | -4.35314E-03 |
| 8th order | -1.03711E-04 | 1.82863E-05 | 7.84876E-04 | 1.67277E-03 |
| 10th order | 3.70091E-05 | 7.19065E-05 | 3.56363E-05 | -2.92524E-04 |
| 12th order | -4.64307E-06 | 3.30568E-06 | -5.88205E-05 | -3.38407E-05 |
| 14th order | 9.84425E-08 | -5.51515E-06 | 8.26009E-06 | 1.49529E-05 |
| 16th order | 1.20609E-08 | 5.34620E-07 | -2.94583E-07 | -1.11322E-06 |

- material

| | L1 | L2 | L3 | Prism |
|---|---|---|---|---|
| Nd | 1.497 | 1.616 | 1.687 | 1.762 |
| Vd | 81.5 | 25.8 | 18.3 | 40.1 |
| material | Glass | Plastic | Plastic | Glass |

FIG. 6D

*Table 6E. Example Values for Parameters of Optical Systems 400e*

- all surface positons based on L1S1 global coordinate

|  | x | z | angle (α) |
|---|---|---|---|
| aperture stop | 0 | 0.8 | 0 |
| L1S1 | 0.000 | 0.000 | 0 |
| L1S2 | 0.000 | 1.715 | 0 |
| L2S1 | 0.000 | 1.815 | 0 |
| L2S2 | 0.000 | 2.957 | 0 |
| L3S1 | 0.000 | 3.129 | 0 |
| L3S2 | 0.000 | 3.549 | 0 |
| PrismS1 | 0.000 | 4.556 | 0 |
| prismS2 | 0.000 | 5.750 | -31 |
| PrismS3 | -6.432 | 6.782 | 0 |
| prismS4 | -8.848 | 5.497 | -31 |
| IFS1 | -8.848 | 7.972 | 0 |
| IFS2 | -8.848 | 8.182 | 0 |
| image plane (INF) | -8.848 | 8.282 | 0 |

- coefficient of each surface

|  | L1S1 | L1S2 |
|---|---|---|
| Radius of curvature | 4.477050767 | 94.97557225 |

|  | L2S1 | L2S2 | L3S1 | L3S2 |
|---|---|---|---|---|
| Radius of curvature | 5.22788E+00 | 5.06794E+00 | 2.46278E+00 | 1.81937E+00 |
| k (conic) | -1.06448E-01 | 1.45369E+00 | -6.97655E-01 | -7.23279E-01 |
| 4th order | 4.17642E-03 | 1.88102E-02 | -7.32213E-03 | -2.38947E-02 |
| 6th order | 4.84957E-05 | -3.54661E-03 | -2.39385E-03 | 1.11568E-03 |
| 8th order | -1.06986E-04 | 1.20928E-03 | 9.97590E-04 | 1.11251E-04 |
| 10th order | 4.88413E-05 | -1.15732E-04 | -1.17259E-04 | -1.87346E-04 |
| 12th order | -9.81406E-06 | -1.14398E-05 | -5.21190E-05 | -1.55183E-07 |
| 14th order | 9.17328E-07 | 7.15673E-07 | 1.24769E-05 | 8.25533E-06 |
| 16th order | -3.11904E-08 | 2.67589E-07 | -7.36504E-07 | -8.09515E-07 |

- material

|  | L1 | L2 | L3 | Prism |
|---|---|---|---|---|
| Nd | 1.439 | 1.616 | 1.687 | 1.717 |
| Vd | 94.9 | 25.8 | 18.3 | 47.9 |
| material | Glass | Plastic | Plastic | Glass |

*FIG. 6E*

*Table 6F. Example Values for Parameters of Optical Systems 400f*

- all surface positons based on L1S1 global coordinate

| | x | z | angle (α) |
|---|---|---|---|
| aperture stop | 0 | 0.3 | 0 |
| L1S1 | 0.000 | 0.000 | 0 |
| L1S2 | 0.000 | 2.712 | 0 |
| L2S1 | 0.000 | 2.812 | 0 |
| L2S2 | 0.000 | 3.596 | 0 |
| L3S1 | 0.000 | 3.696 | 0 |
| L3S2 | 0.000 | 4.679 | 0 |
| L4S1 | 0.000 | 4.779 | 0 |
| L4S2 | 0.000 | 5.648 | 0 |
| PrismS1 | 0.000 | 7.000 | 0 |
| prismS2 | 0.000 | 9.197 | -31 |
| PrismS3 | -11.835 | 11.096 | 0 |
| prismS4 | -16.281 | 8.732 | -31 |
| IFS1 | -16.281 | 12.286 | 0 |
| IFS2 | -16.281 | 12.496 | 0 |
| image plane (INF) | -16.281 | 12.596 | 0 |

- coefficient of each surface

| | L1S1 | L1S2 |
|---|---|---|
| Radius of curvature | 8.199489887 | -3454.392061 |

| | L2S1 | L2S2 | L3S1 | L3S2 | L4S1 | L4S2 |
|---|---|---|---|---|---|---|
| Radius of curvature | 1.34608E+01 | 2.99185E+01 | 1.45327E+01 | 4.03211E+00 | 4.40636E+00 | 4.87520E+00 |
| k (conic) | -1.58223E+01 | 0.00000E+00 | 0.00000E+00 | 0.00000E+00 | 0.00000E+00 | 0.00000E+00 |
| 4th order | 1.37952E-03 | 1.97773E-03 | -1.45663E-03 | -4.58486E-03 | -7.27404E-04 | 2.10678E-04 |
| 6th order | -1.02139E-05 | -1.26788E-04 | 3.32745E-05 | 2.76854E-04 | 1.36726E-04 | 9.14918E-05 |
| 8th order | -1.49005E-06 | 1.01177E-05 | 6.91880E-06 | -1.56456E-05 | -1.50550E-05 | -1.69840E-05 |
| 10th order | 9.32601E-08 | -4.24274E-07 | -1.20011E-07 | 1.51474E-06 | 3.90992E-07 | 7.45642E-07 |
| 12th order | -1.26037E-08 | -9.33129E-10 | -3.52449E-08 | -2.79552E-07 | -9.48579E-08 | -1.44786E-07 |
| 14th order | 5.04979E-10 | 9.30947E-11 | 1.67409E-09 | 2.25793E-08 | 9.45321E-09 | 1.89014E-08 |
| 16th order | -5.81297E-12 | 4.58639E-12 | 5.09289E-11 | -6.44717E-10 | -1.84255E-10 | -9.96678E-10 |
| 18th order | | 9.48752E-14 | -5.67102E-12 | | -1.00296E-11 | -6.09843E-12 |
| 20th order | | -2.98115E-16 | 1.22131E-13 | | | 1.09178E-12 |

- material

| | L1 | L2 | L3 | L4 | Prism |
|---|---|---|---|---|---|
| Nd | 1.595 | 1.567 | 1.616 | 1.671 | 1.518 |
| Vd | 67.7 | 37.4 | 25.8 | 19.2 | 58.9 |
| material | Glass | Plastic | Plastic | Plastic | Glass |

*FIG. 6F*

*Table 6G Example Values for Parameters of Optical Systems 400g*

- all surface positons based on L1S1 global coordinate

|  | x | z | angle (α) |
|---|---|---|---|
| aperture stop | 0 | 0.8 | 0 |
| L1S1 | 0.000 | 0.000 | 0 |
| L1S2 | 0.000 | 1.449 | 0 |
| L2S1 | 0.000 | 1.549 | 0 |
| L2S2 | 0.000 | 2.868 | 0 |
| L3S1 | 0.000 | 4.655 | 0 |
| L3S2 | 0.000 | 5.352 | 0 |
| PrismS1 | 0.000 | 5.500 | 0 |
| prismS2 | 0.000 | 7.068 | -30 |
| PrismS3 | -7.738 | 8.400 | 0 |
| prismS4 | -10.046 | 7.068 | -30 |
| IFS1 | -10.046 | 9.590 | 0 |
| IFS2 | -10.046 | 9.800 | 0 |
| image plane (INF) | -10.046 | 9.900 | 0 |

- coefficient of each surface

|  | L1S1 | L1S2 | L2S1 | L2S2 | L3S1 | L3S2 |
|---|---|---|---|---|---|---|
| Radius of curvature | 6.955876703 | -38.49460159 | 3.80026E+00 | 2.14283E+00 | 9.25888E+00 | 3.82705E+01 |
| k (conic) | 1.287226945 | 0 | 2.45439E-01 | -5.47738E-01 | -1.15628E+00 | 0.00000E+00 |
| 4th order | 0.001018439 | 0.00443608 | -5.18753E-03 | -1.32674E-02 | -1.74914E-03 | -1.40886E-03 |
| 6th order | -0.000133578 | -0.000452445 | 2.47884E-04 | 1.89425E-03 | 4.92169E-04 | 2.20327E-04 |
| 8th order | 1.07E-05 | 2.64E-05 | -5.67205E-05 | -3.60234E-04 | -9.75796E-05 | -4.29867E-05 |
| 10th order | -5.15E-07 | 9.52E-08 | 2.56339E-07 | 3.13470E-05 | 1.04468E-05 | -7.63972E-06 |
| 12th order | -1.98E-08 | -9.24E-08 | 5.11299E-07 | -1.77847E-06 | -1.00089E-06 | 3.22373E-06 |
| 14th order | 3.85E-09 | 6.67E-09 | -2.70290E-08 | 5.79880E-07 | 2.54453E-07 | -3.63208E-07 |
| 16th order | -8.18E-11 | -1.63E-10 | -1.30930E-09 | -6.52777E-08 | -1.58368E-08 | 1.86407E-08 |

- material

|  | L1 | L2 | L3 | Prism |
|---|---|---|---|---|
| Nd | 1.544 | 1.671 | 1.544 | 1.571 |
| Vd | 56.0 | 19.2 | 56.0 | 53.0 |
| material | Plastic | Plastic | Plastic | Glass |

FIG. 6G

*Table 6H. Example Values for Parameters of Optical Systems 400h*

- all surface positons based on L1S1 global coordinate

|   | x | z | angle (α) |
|---|---|---|---|
| aperture stop | 0 | 0 | 0 |
| L1S1 | 0.000 | 0.000 | 0 |
| L1S2 | 0.000 | 1.216 | 0 |
| L2S1 | 0.000 | 1.316 | 0 |
| L2S2 | 0.000 | 2.716 | 0 |
| L3S1 | 0.000 | 4.276 | 0 |
| L3S2 | 0.000 | 5.300 | 0 |
| PrismS1 | 0.000 | 5.600 | 0 |
| prismS2 | 0.000 | 7.114 | -30 |
| PrismS3 | -7.471 | 8.400 | 0 |
| prismS4 | -9.699 | 7.114 | -30 |
| IFS1 | -9.699 | 9.590 | 0 |
| IFS2 | -9.699 | 9.800 | 0 |
| image plane (INF) | -9.699 | 9.900 | 0 |

- coefficient of each surface

|   | L1S1 | L1S2 | L2S1 | L2S2 | L3S1 | L3S2 |
|---|---|---|---|---|---|---|
| Radius of curvature | -45.36329921 | -5.266259019 | 3.56336E+00 | 1.96296E+00 | 3.98027E+01 | -1.07935E+01 |
| k (conic) | 0 | 0 | -1.51891E-01 | -7.34101E-01 | 0.00000E+00 | 0.00000E+00 |
| 4th order | 0.002629448 | 0.009228133 | -6.48282E-03 | -2.34666E-02 | 2.36975E-03 | 1.45251E-03 |
| 6th order | -0.000300978 | -0.00081557 | 5.05137E-04 | 3.98944E-03 | -1.63234E-04 | -9.31809E-05 |
| 8th order | 2.75E-05 | 6.16E-05 | -5.34950E-05 | -6.49455E-04 | 1.58784E-04 | 7.32411E-05 |
| 10th order | -1.37E-06 | -1.87E-06 | -7.45278E-07 | 6.60618E-05 | -2.52537E-05 | -1.18220E-05 |
| 12th order | 4.92E-08 | -2.98E-08 | 4.88078E-07 | -5.00483E-06 | 1.49140E-06 | 1.72107E-06 |
| 14th order | 5.46E-10 | 6.37E-09 | -2.99508E-08 | 4.13232E-07 | 6.82591E-08 | -2.00210E-07 |
| 16th order | -5.24E-11 | -1.64E-10 | 3.37281E-10 | -2.13968E-08 | -5.57996E-09 | 1.42203E-08 |

- material

|   | L1 | L2 | L3 | Prism |
|---|---|---|---|---|
| Nd | 1.544 | 1.671 | 1.544 | 1.516 |
| Vd | 56.0 | 19.2 | 56.0 | 64.1 |
| material | Plastic | Plastic | Plastic | Glass |

*FIG. 6H*

OPTICAL SYSTEM INCLUDING LENSES AND PRISM FOR TELEPHOTO CAMERAS

This application claims benefit of priority to U.S. Provisional Application Ser. No. 63/083,038, entitled "Optical System for Telephoto Cameras," filed Sep. 24, 2020, and which is hereby incorporated herein by reference in its entirety.

BACKGROUND

Technical Field

This disclosure relates generally to cameras and more specifically to optical systems for small form factor cameras.

Description of the Related Art

Telephoto cameras generally have relatively long focal lengths and are great for capturing scenes and subject at a far distance. However, the advent of small, mobile multipurpose devices such as smartphones, tablet, pad, or wearable devices has created a need for high-resolution, small form factor cameras for integration in the devices. Therefore, it is desirable to have an optical system suitable for small form factor, high-quality telephoto cameras.

BRIEF DESCRIPTION OF THE DRAWINGS

FIG. 2A shows example values of some parameters for an optical system, according to some embodiments.

FIG. 2B shows example values of some additional parameters for an optical system, according to some embodiments.

FIG. 5 shows example values of some parameters for some example optical systems, according to some embodiments.

FIGS. 6A-6H show example values of some additional parameters for some example optical systems, according to some embodiments.

Figure 1:
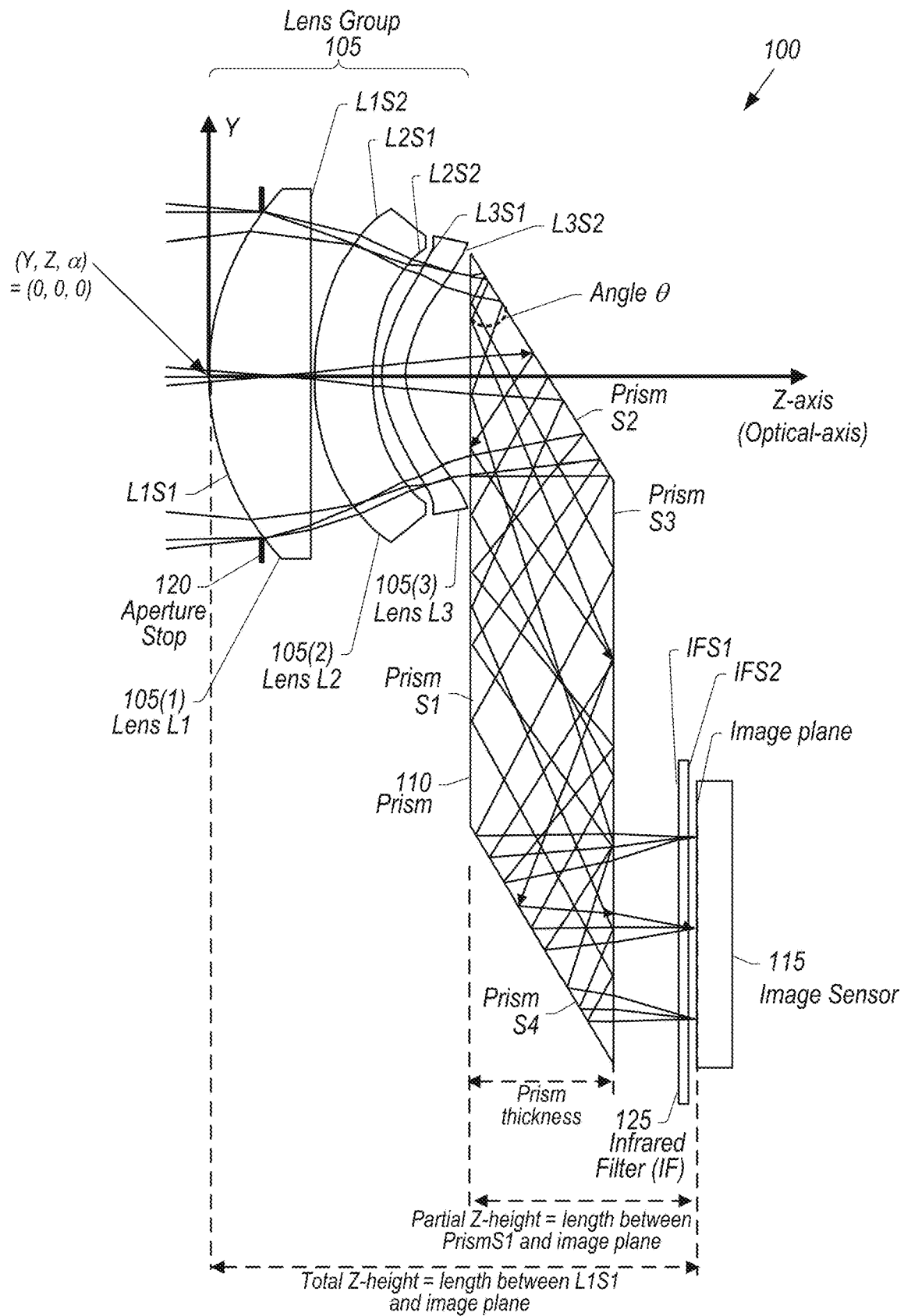
FIG. 1 shows an example optical system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to an optical system for cameras, in particular, small form factor telephoto cameras. In some embodiments, such telephoto cameras may be integrated in small, mobile multipurpose devices, e.g., smartphones, tablet, pad, wearable devices, and the like. In some embodiments, the optical system may include a plurality of lenses, a prism, and an image sensor. In some embodiments, the prism may be arranged, optically, between the plurality of lenses and the image sensor along the optical transmitting path of light captured by the plurality of lenses to the image sensor. In some embodiments, the prism may have at least four surfaces. For instance, the prism may include a parallelogram prism, while a first surface of the prism is parallel to a third surface of the prism and a second surface of the prism is parallel to a fourth surface of the prism. In some embodiments, the prism may be arranged such that the first surface may be positioned facing the plurality of lenses, whilst the third surface may face the image sensor. In some embodiments, the second and fourth surfaces of the prism may each include a reflective coating (or reflector), such that the second and fourth surfaces may reflect light at respective surfaces and the first and third surfaces of the prism may reflect light when the incident angle of the light is close to or greater than a critical angle at respective surfaces.

In some embodiments, the prism may fold light within the prism, guiding the light from the plurality of lenses to pass through the prism to the image sensor. For instance, as for a parallelogram prism, light from the plurality of lenses may pass through the first surface of the prism to enter the prism. At least some of the light may arrive at and then become reflected at the second surface of the prism—e.g., the light being folded once. At least some of the light reflected from the second surface of the prism may be reflected back to the first surface of the prism. When the incident angle of the light is close to or larger than a critical angle of the prism, total internal reflection (TIR) may occur and the light may thus be reflected at the first surface of the prism—e.g., the light being folded twice. At least some of the light reflected from the first surface may transmit to and get reflected at the third surface prism—e.g., the light being folded three times. Next, at least some of the light reflected from the third surface of the prism may reach and be reflected at the fourth surface of the prism, and exit the prism to the image sensor—e.g., the light being folded four times. In short, in the above example of the parallelogram prism, the light may be folded four times within the prism before it exits the prism to the image sensor. Given that the prism may have multiple surfaces, e.g., at least four surfaces, the prism may be designed to have a thin thickness—e.g., the length between the first and third surfaces of a parallelogram prism may have a small value—but still be able to fold the light for many times. Such a prism may reduce at least the Z-height (e.g., a height along an optical axis or Z-axis of the lenses) and accordingly the entire size of the optical system.

FIG. 1 shows an example optical system, according to some embodiments. In this example, optical system 100 may include lens group 105, prism 110, and image sensor 115. FIG. 1 also illustrates a global optical coordinate system defined by Y-axis, Z-axis, and angle α, where angle α refers to an angle relative to Z-axis on a plane perpendicular to Y-axis. In some embodiments, lens group 105 may include a plurality of lenses. In some embodiments, lens group 105 may include at least three lenses, e.g., lens 105(1) L1, lens 105(2) L2, and lens 105(3) L3, as shown in FIG. 1. The plurality of lenses (e.g., lens 105(1) L1, lens 105(2) L2, and lens 105(3) L3) may individually include at least a front surface facing an environment and a rear surface opposite to the front surface, e.g., as indicated by L1S1 and L1S2 of lens 105(1) L1, L2S1 and L2S2 of lens 105(2) L2, and L3S1 and L3S2 of lens 105(3) L3 in FIG. 1. In some embodiments, optical system 100 may include aperture stop 120 which may limit and control the amount of light entering or captured by lens group 105. In some embodiments, optical system 100 may optionally include infrared filter (IF) 125, as shown in FIG. 1, which may block or prevent at least some infrared light from reaching image sensor 115. As shown in FIG. 1, infrared filter (IF) may include at least a first surface (IFS1) facing prism 110 and a second surface (IFS2) facing image sensor 115.

In some embodiments, as shown in FIG. 1, optical system 100 may include prism 110 arranged, optically, between lens group 105 and image sensor 115 along the optical transmitting path of light from lens group 105 to image sensor 115. In some embodiments, prism 110 may include at least four surfaces. For instance, as shown in FIG. 1, prism 110 may include a parallelogram prism, while a first surface (Prism S1) of prism 110 is parallel to a third surface (Prism S3) of prism 110 and a second surface (Prism S2) of prism 110 is parallel to a fourth surface (Prism S4) of prism 110. In some embodiments, prism 110 may be arranged such that the first surface (Prism S1) may face lens group 105, whilst the third surface (Prism S3) may face image sensor 115. In some embodiments, the front surface of the first lens (e.g., surface L1S1 of lens 105(1) L1) of lens group 105 may be approximately parallel to an image plane of image sensor 115, such that light incident at the front surface of the first lens 105(1) L1 may be parallel to light incident at the image plane of image sensor 115.

In some embodiments, the second surface (Prism S2) and/or fourth surface (Prism S4) of prism 110 may individually include a reflective coating (or reflector). For instance, the reflective coating may include mirror coating based on a thin layer of metal, a film with a white inner surface, and the like. Therefore, the second (Prism S2) and fourth surfaces (Prism S4) of prism 110 may reflect light at respective surfaces. The first (Prism S1) and third surfaces (Prism S3) of prism 110 may transmit light or pass light through respective surfaces. In addition, the first (Prism S1) and third surfaces (Prism S3) of prism 110 may reflect light under a phenomenon called total internal reflection (TIR). TIR may occur when the incident angle of light is close to or greater than a certain limiting angle, called the critical angle. An incident angle refers to an angle between the light incident on a surface and the line (called the normal) perpendicular to the surface at the point of incidence. Therefore, the first surface (Prism S1) and third surface (Prism S3) of prism 110 may pass through light when the incident angle of the light is less than the critical angle. Conversely, when the incident angle of light is close to or greater than the critical angle, the first (Prism S1) and third surfaces (Prism S3) of prism 110 may reflect the light at respective surfaces. In some embodiments, the first (Prism S1) and/or third surfaces (Prism S3) of prism 110 may further individually include an anti-reflective coating.

Referring back to FIG. 1, prism 110 may fold light within prism 110 multiple times to guide the light from lens group 105 passing through prism 110 to image sensor 115. For instance, as for parallelogram prism 110 shown in FIG. 1, light from lens group 105 may pass through the first surface (Prism S1) of prism 110 to enter prism 110. At least some of the light may arrive at and then get reflected at the second surface (Prism S2) of prism 110, as indicated by the edge in FIG. 1—e.g., the light being folded once. At least some of the light reflected from the second surface (Prism S2) of prism 110 may bounce back to the first surface (Prism S1) of prism 110, as indicated by the edge in FIG. 1. When the incident angle of the light is close to or greater than the critical angle of prism 110, the light may be reflected at the first surface (Prism S1) of prism 110 under TIR—e.g., the light being folded twice. Next, at least some of the light reflected from the first surface (Prism S1) may transmit to and become reflected at the third surface prism (Prism S3) of prism 110—e.g., the light being folded three times. Finally, at least some of the light reflected from the third surface (Prism S3) of prism 110 may reach the fourth surface (Prism S4) of prism 110, get reflected at the fourth surface (Prism S4), and exit prism 110 to focus on an image plane on image sensor 115—e.g., the light being folded four times. Therefore, in this example of FIG. 1, at least some light passing through lens group 105 may be folded four times within prism 110 before it exits prism 110 to image sensor 115.

The above described light folding of prism 110 may effectively increase the focal length between lens group 105 and image sensor 115 of optical system 100. For instance, in some embodiments, a ratio between the optical path length in prism 110 approximately from light entering prism 110 through the first surface (Prism S1) to exiting prism 110 out of the third prism (Prism S3) and the focal length of lens group 105 may be in a range between 0.6 and 1.0—e.g., 0.6<(optical path length in prism 110×power of lens group 105)<1.0, where power is the reciprocal of the focal length of lens group 105. Therefore, optical system 100 may use a thin prism 110—e.g., having a small thickness approximately between the first surface (Prism S1) and third surface (Prism S3) of prism 110—to still provide a long effective focal length for telephoto cameras. For instance, in some embodiments, a ratio between a partial Z-height (e.g., measured approximately between the first surface (Prism S1) to the image plane of image sensor 115 along the optical axis or Z-axis) and a total Z-height (e.g., measured approximately between the front surface of the first lens (L1S1) of lens group 105 to the image plane of image sensor 115 along the optical axis or Z-axis) of optical system 100, as shown in FIG. 1, may be in a range between 0.2 and 0.6—e.g., 0.2<(partial Z-height/total Z-height)<0.6, and a ratio between the thickness of prism 110 (e.g., measured approximately from the first surface (Prism S1) to third surface (Prism S3) of prism 110) and the thickness of lens group 105 (e.g., measured approximately from the front surface of the first lens (L1S1) and the rear surface of the last lens (L3S2) of lens group 105) may be in a range from 0.2 to 0.8—e.g., 0.2<(thickness of prism 110/thickness of lens group 105) <0.8. If the Z-height ratio and/or the thickness ratio is too high, prism 110 may be too large and heavy and may not effectively reduce the size of optical system 100, or lens group 105 may be too thin and may not achieve good light capture performance. Alternatively, if the Z-height ratio and/or the thickness ratio is too low, prism 110 may be too thin and may not capture sufficient light from the entire field of view (FOV). Therefore, designing optical system 100 to have appropriate parameters may reduce at least the partial Z-height and/or total Z-height of optical system 100 but still maintain high-quality optical performance. In some embodiments, the reduction of the Z-heights may accordingly decrease the size of optical system 100 and thus benefit the design and integration of small form factor telephoto cameras (using optical system 100). In some embodiments, the partial Z-height of optical system 100 may be in a range between 3.57 and 5.6 millimeters. In some embodiments, the thickness of prism 110 of optical system 100 may be in a range of 2.07 and 4.1 millimeters. In some embodiments, the effective focal length of optical system 100 may be in a range between 17.2 and 27.2 millimeters. In some embodiments, the F-number of optical system 100 may be in a range between 2.2 and 2.8. More example values for some parameters of optical system 100 of FIG. 1 can be found in FIG. 2A.

Note that, for purposes of illustration, prism 110 is shown as a parallelogram prism in FIG. 1. In some embodiments, prism 110 may include other shapes, for example, a pentagon, a hexagon, and the like, and still provide the above described light folding functions and design benefits. For a given shape, the angles between individual surfaces of prism 110 may also be designed for desired performance. For instance, in some embodiments, when prism 110 includes a parallelogram prism, as shown in FIG. 1, the angle θ between the first surface (Prism S1) and second surface (Prism S2) of prism 110 may be in a range of 25 and 35 degrees (e.g., 25<θ<35 degrees). In some embodiments, the plurality of lenses of lens group 105, e.g., lens 105(1) L1, lens 105(2) L2, and lens 105(3) L3, may be made from various light transmitting materials. For instance, lens group 105 may include a combination of both glass and plastic lenses. In another example, all the lenses of lens group 105 may be glass lenses, or plastic lenses. Similarly, prism 110 may also include various optically transmitting materials, e.g., one or more glass prisms, one or more plastic prisms, or a combination of both glass prism(s) and plastic prism(s). Compared to glass, plastics may provide less weight and lower material cost. In some embodiments, using a glass lens for the first lens of a lens group (e.g., 105(1) L1 of lens group 105) may mitigate thermal focus shift within the optical system (e.g., optical system 100). For instance, the thermal focus shift may be suppressed to less than 0.25 μm/degree. In some embodiments, using a material with a high Abbe number Vd (e.g., Vd>60) for the first lens of a lens group (e.g., 105(1) L1 of lens group 105) may correct axial color aberration. In some embodiments, lens groups 105 may include one or more rotationally symmetric lenses. A rotationally symmetric lens may refer to a lens with symmetric optical characteristics relative to the optical axis or Z-axis of the lens. In other words, rotation of the lens about Z-axis would not affect the optical characteristics of the lens. In some embodiments, all lenses of lens group 105 may use aspherical lenses. In some embodiments, all lenses of lens group 105 may use spherical lenses. In some embodiments, lens group 105 may include a combination of both aspherical and spherical lenses. A spherical lens may refer to a lens having a same curve across at least one surface like the shape of a ball, whilst an aspherical lens may refer to a lens having a surface which gradually changes in its curvature from the center of the lens out to the edge. In some embodiments, the aspherical lens may help optical system 100 to achieve a low F-number. For a given focal length, a lower F-number means that optical system 100 may use larger aperture stop 120, and therefore a camera including optical system 100 may have a fast shutter speed. In some embodiments, the design of an aspherical surface of a lens may follow the following equation:

$$z = \frac{\frac{h^2}{r}}{1 + \sqrt{1 - \frac{(1+k)h^2}{r^2}}} + Ah^4 + Bh^6 + Ch^8 + \ldots$$

where z refers to the sag of an aspherical surface parallel to the optical axis of the lens, h is the radial distance from the optical axis, r is the radius of the curvature, k is the conic constant, and A, B, and C refer to the $4^{th}$, $6^{th}$, and $8^{th}$ order aspherical coefficients. FIG. 2B shows example values for some additional parameters of optical system 100 shown in FIG. 1.

Figure 3A:
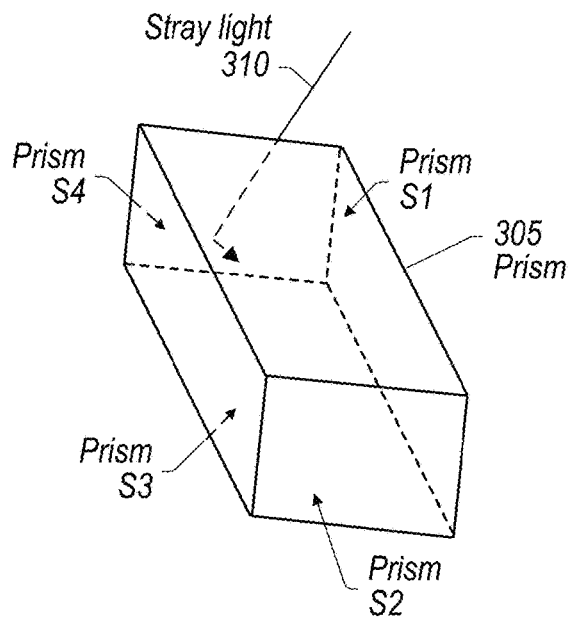
FIGS. 3A-3C show an example prism including aperture masks, according to some embodiments.
Figure 3B:
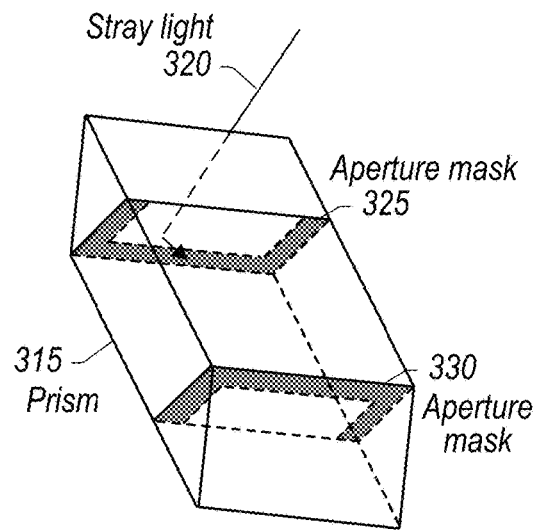
Figure 3C:
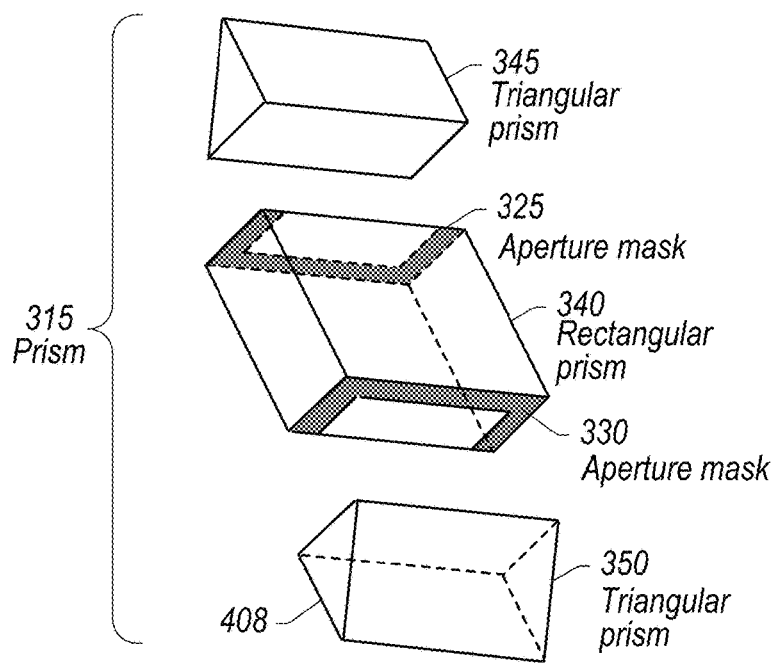
Figure 4A:
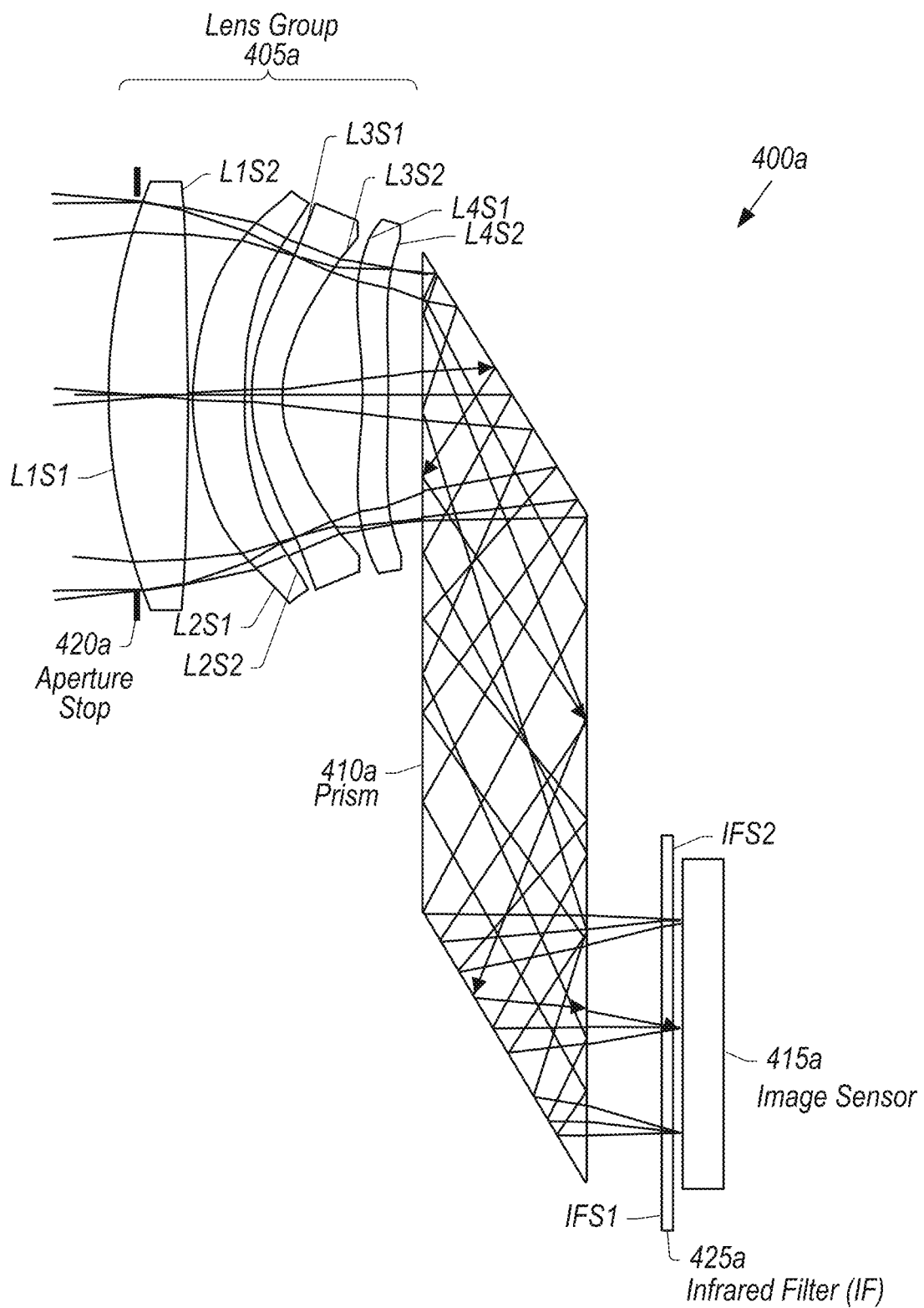
FIGS. 4A-4H show example design variations for an optical system, according to some embodiments.
Figure 4B:
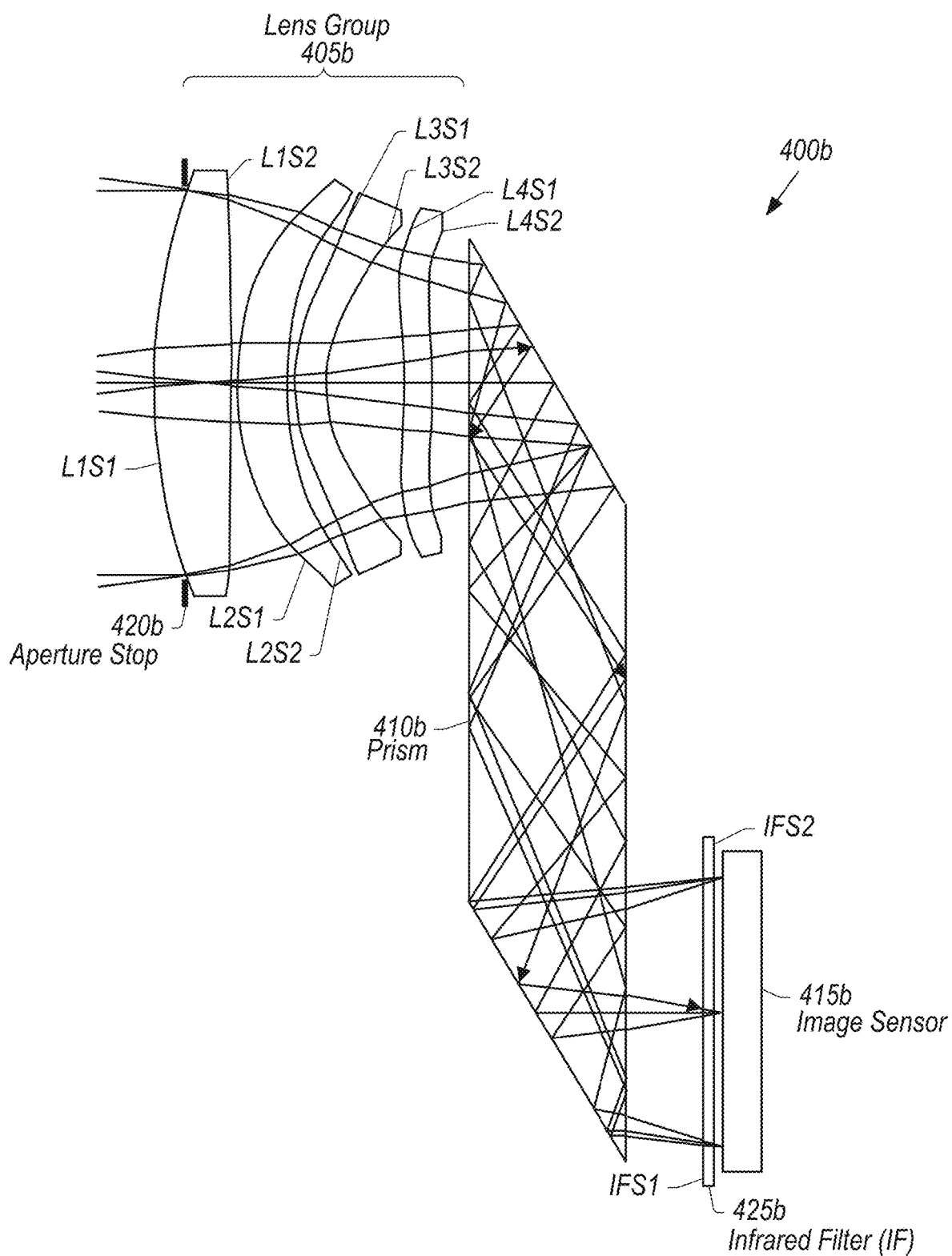
Figure 4C:
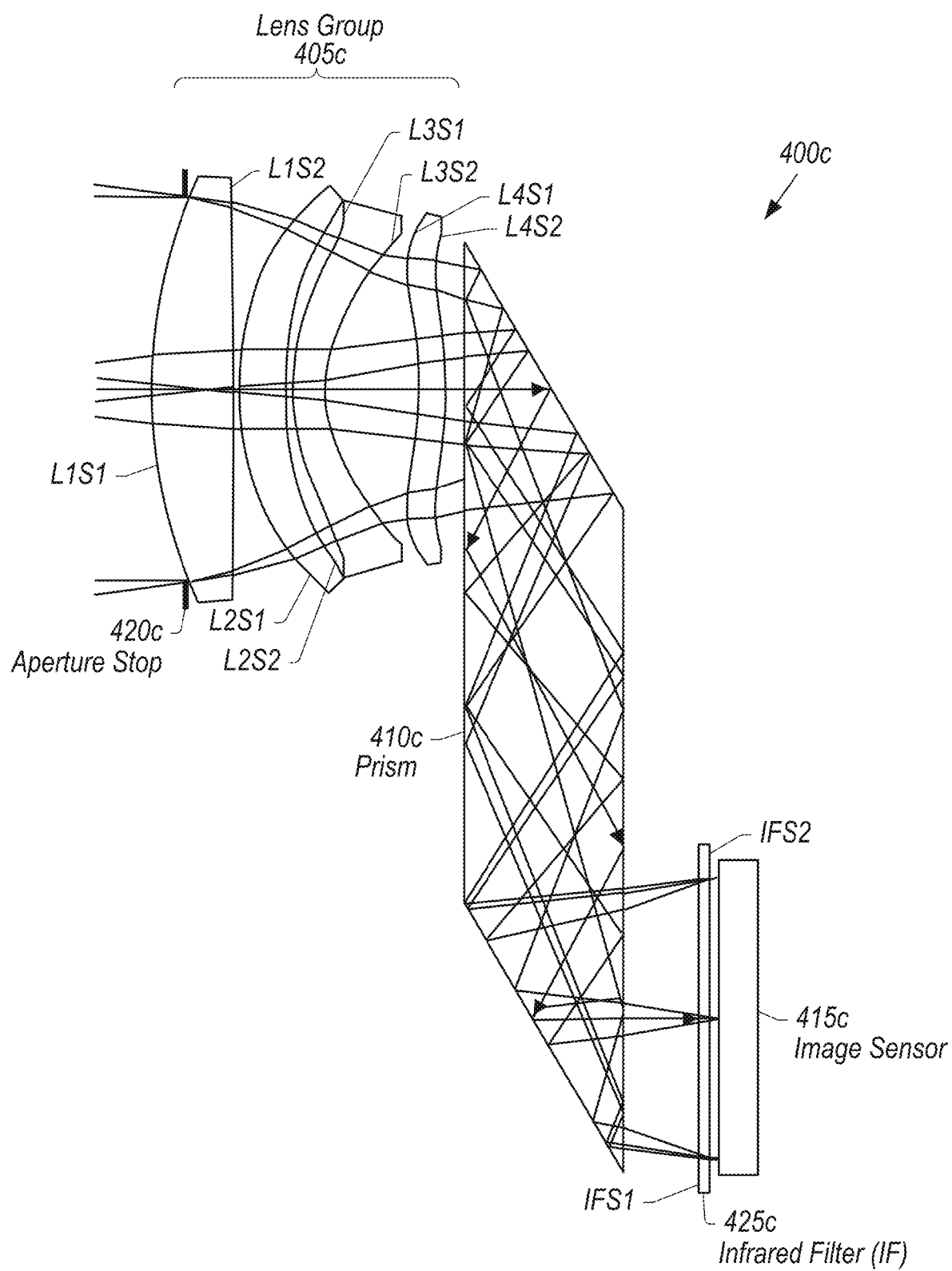
Figure 4D:
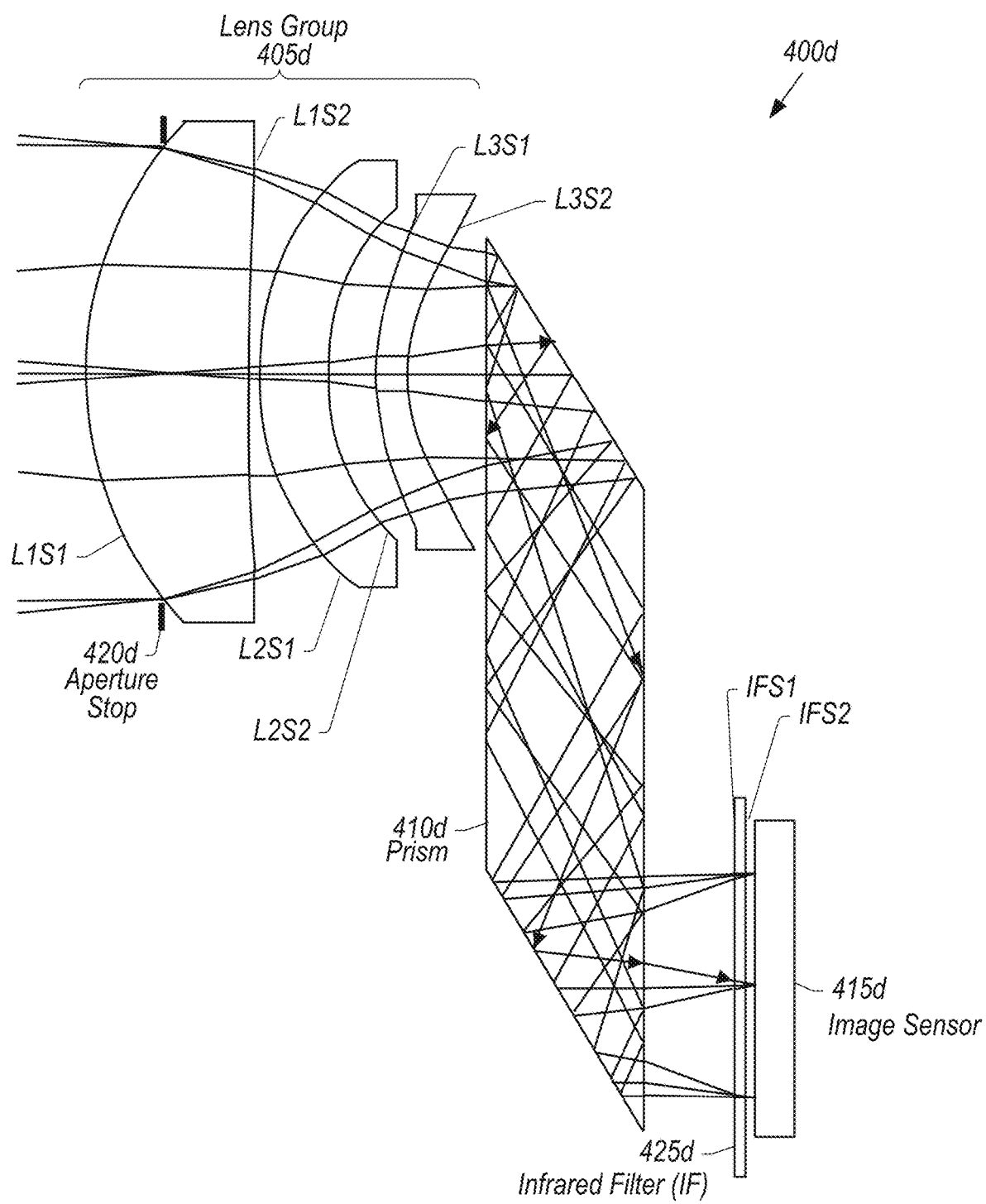
Figure 4E:
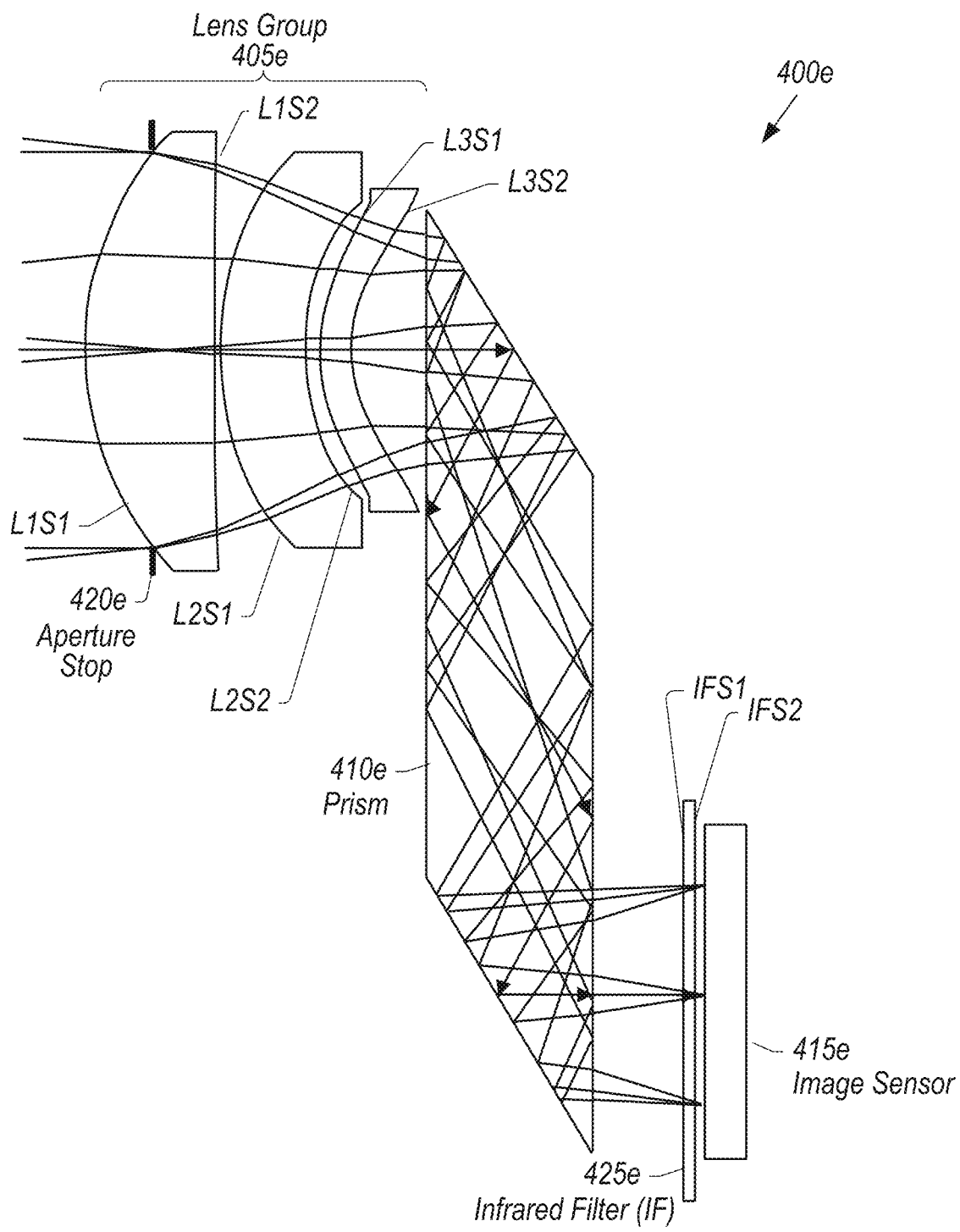
Figure 4F:
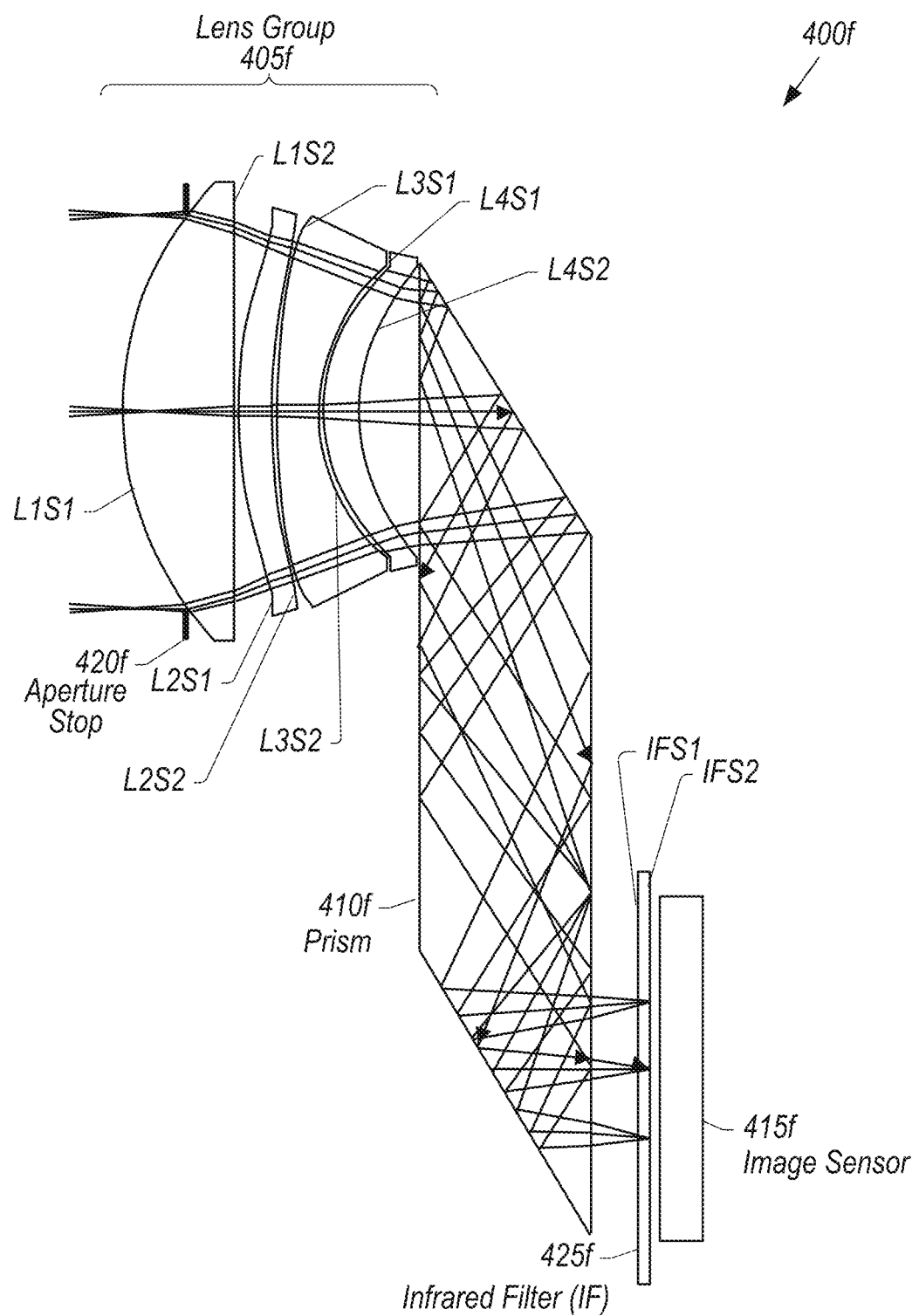
Figure 4G:
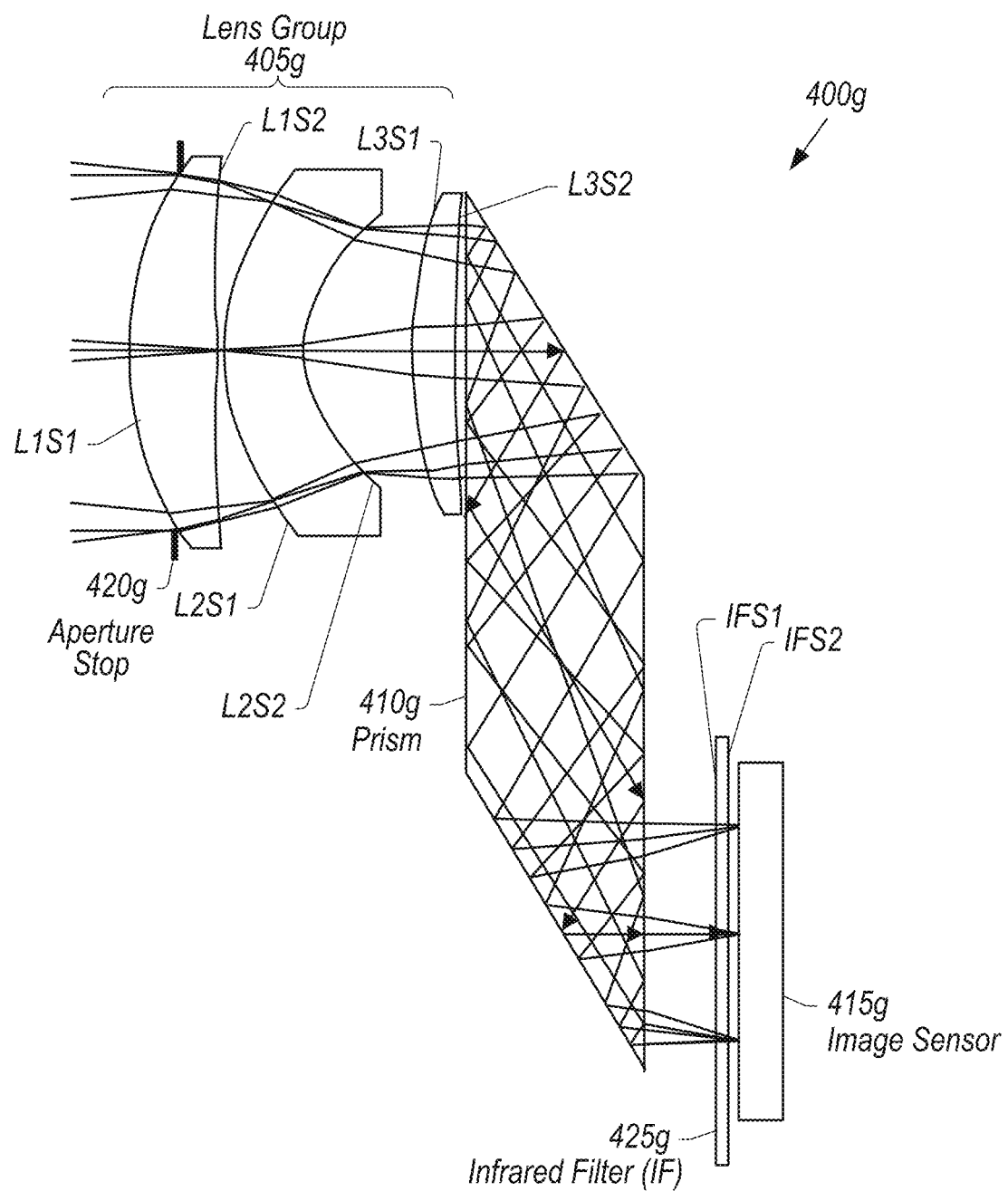
Figure 4H:
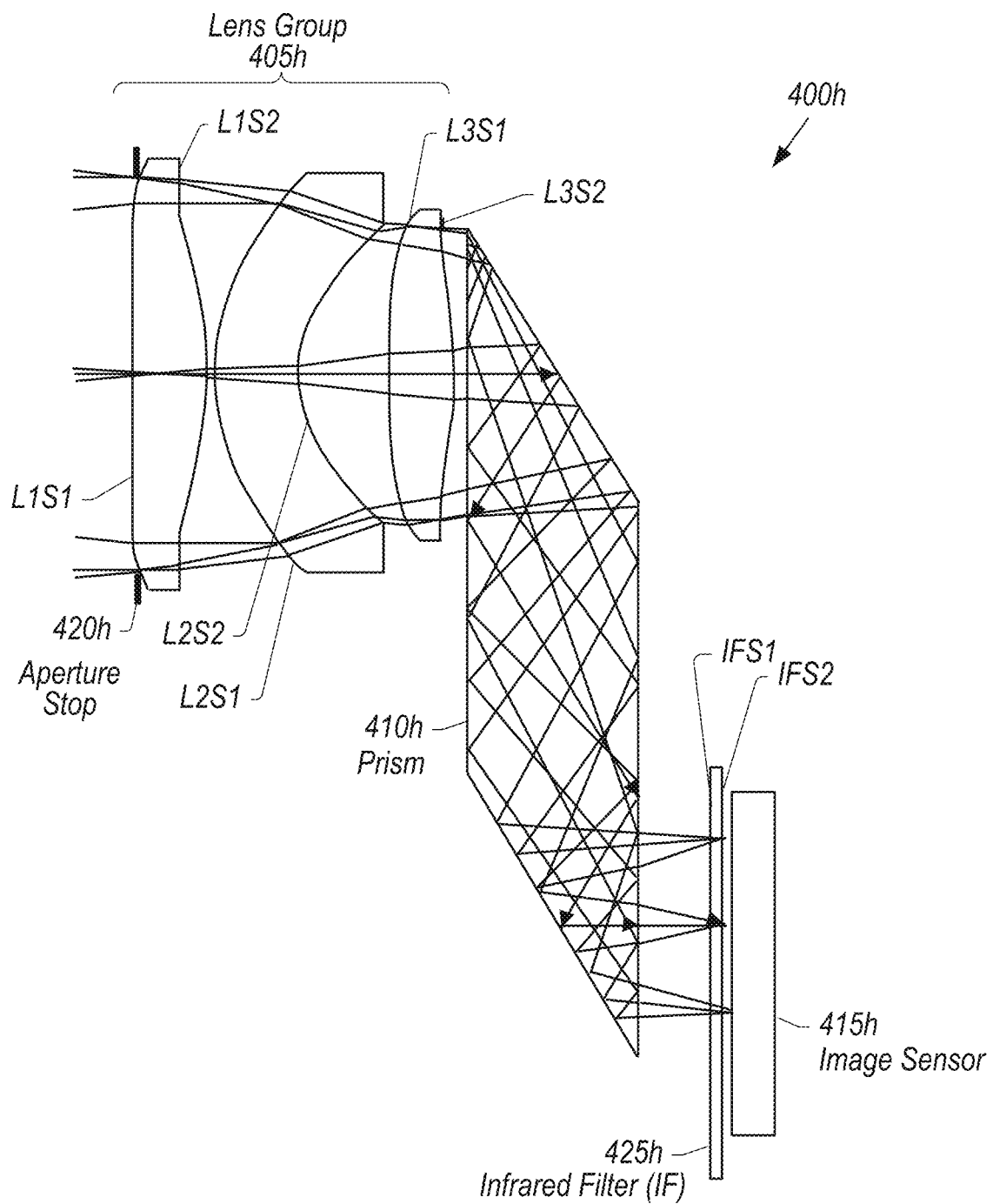

FIGS. 3A-3C show an example prism including aperture masks, according to some embodiments. In some embodiments, the aperture masks are provided to reduce or mitigate flare. For an optical system, flare may be caused when stray light from the environment, especially stray light brighter than light from a scene or subject which a camera is to capture, enters an optical system. The stray light from the environment may enter the optical system from various directions and/or other components of a camera (e.g., a side wall of a housing of the camera), and finally end up in the image. As shown in FIG. 3A, stray light 310 may enter prism 305, e.g., from a surface (e.g., Prism S4) of prism 305. In some embodiments, a prism may include one or more aperture masks inside the prism and/or at a surface of the prism for reducing the flare. In this example, prism 315 may include aperture masks 325 and 330 inside prism 315 as shown in FIG. 3B. Further, in some embodiments, aperture masks 325 and/or 330 may be designed to have various shapes and/or sizes at various spatial positions. The purpose is to have aperture masks 325 and/or 330 to cover the areas supposedly to be hit by the stray light from the environment. This way, aperture masks 325 and/or 330 may intercept and absorb the stray light and thus reduce the flare, as shown in FIG. 3B. For instance, as shown in FIG. 3B, aperture masks 325 and 330 may positioned parallel to each other at opposite sides inside prism 315 to mitigate flare caused by stray light coming from opposite sides (e.g., surfaces Prism S2 and S4) of prism 315. In some embodiments, aperture masks 325 and 330 may have the same or different shapes. As shown in this example, aperture mask 325 may have a different shape from aperture 330, such that aperture mask 325 may block stray light at the bottom and two sides whilst aperture 330 may prevent stray light at the top and two sides. Note that FIG. 3A-3B are provided merely as examples for purposes of illustration. When the flare is caused by stray light coming from one or more other directions, the size, shape, and/or position of an aperture mask may be modified accordingly to achieve the desired anti-flare performance. In some embodiments, aperture masks 325 and/or 330 may individually include an anti-flare coating, dark (e.g., black-color) masking, dark (e.g., black-color) painting, change of flange shape, and the like.

In some embodiments, a prism (e.g., prism 110 in FIG. 1) may include a single, one-piece prism. In some embodiments, a prism may be created by joining together several prisms, e.g., with an optically clear cement. The latter approach may be used to create aperture masks inside a prism, according to some embodiments. For instance, as shown in FIG. 3C, prism 315 may be created by cementing prisms 340, 345, and 350. In this example, prism 315 may be in a parallelogram shape and thus may be created using one rectangular prism 340 and two triangular prisms 345 and 350. In some embodiments, to create aperture masks 325 and/or 330 inside prism 315, aperture masks 325 and/or 330 may be first created at respective surfaces of rectangular prism 340. For instance, aperture masks 325 and 330 may be created at two opposite, parallel surfaces of rectangular prism 340, as shown in FIG. 3C. Next, rectangular prism 340 (having aperture masks 325 and 330) may be cemented with triangular prisms 345 and 350, such that aperture masks 325 and 330 may be positioned at the respective joining surfaces between rectangular prism 340 and triangular prisms 345/350.

FIGS. 4A-4H show example design variations for an optical system, according to some embodiments. As shown in FIGS. 4A-4H, in some embodiments, the lens group of an optical system may include various numbers of lenses. For instance, lens group 405a of optical system 400a in FIG. 4A may include four lenses, whilst lens group 405d of optical system 400d in FIG. 4D may have three lenses. In addition, in some embodiments, the optical system may include lens(es) of various shapes and sizes, e.g., by comparing FIGS. 4A and 4F. The design variations are also illustrated in FIGS. 4B-4C, 4E, and 4G-4H. In addition, in some embodiments, the optical system may include lens(es) and/or prism(s) of various materials, e.g., glass, plastics, and the like. Such design variations are further illustrated in FIGS. 5 and 6A-6H. For instance, FIGS. 5 and 6A-6H shows example values of some parameters for example optical systems 400a-400h in FIGS. 4A-4H. Note that, for purposes of illustration, FIGS. 1-6 show using prism(s) (e.g., prism 110, prism 315 and prisms 410a-410h) to implement the light folding for an optical system (e.g., optical system 100 and optical systems 400a-400h). In some embodiments, the optical system may not necessarily use the prism(s) but instead any suitable light-folding element(s).

Figure 7:
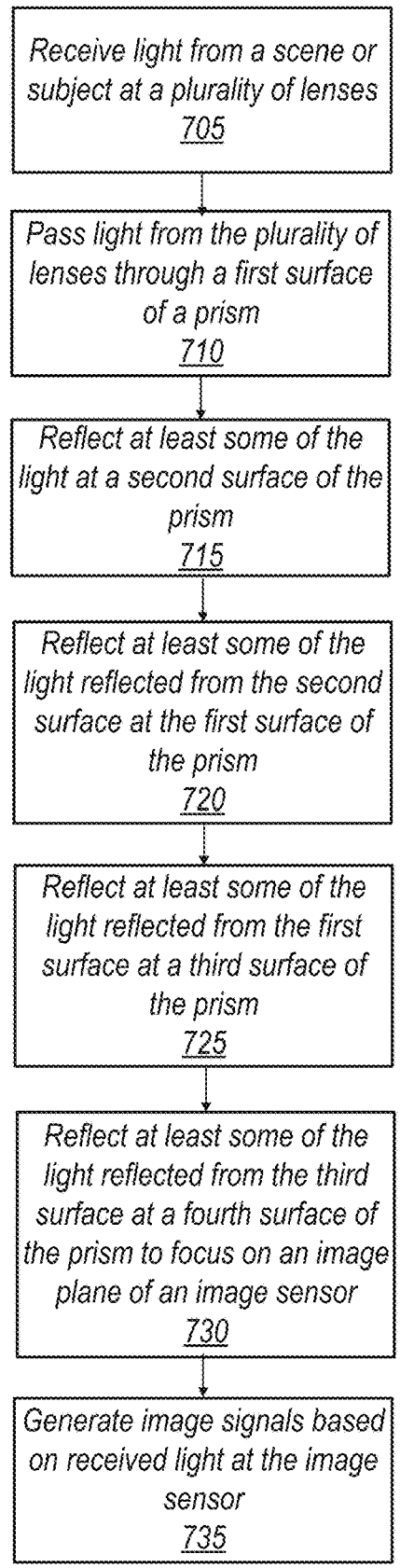
FIG. 7 shows a high-level flowchart of method for capturing images using a camera including an optical system, according to some embodiments.

FIG. 7 shows a high-level flowchart of an example method for capturing images using a camera including an optical system, according to some embodiments. As shown in FIG. 7, in some embodiments, a plurality of lenses (e.g., the plurality of lenses L1-L3 in FIG. 1) of an optical system (e.g., optical system 100 in FIG. 1) may receive light from a scene or subject in an environment, as indicated by block 705. As described above, in some embodiments, the plurality of lenses may include at least three lenses having various materials, shapes, and/or sizes. In some embodiments, the optical system may include a prism (e.g., prism 110 in FIG. 1) which may be arrange optically between the plurality of lenses and an image sensor (e.g., image sensor 115 in FIG. 1) of the optical system. In some embodiments, the prism may include at least four surfaces (e.g., the four surfaces of a parallelogram prism in FIG. 1) which may fold light within the prism at least four times to guide the light passing through the prism from the plurality of lenses to the image sensor.

As described above, in some embodiments, some surfaces of the prism (e.g., surfaces Prism S2 and S4) may individually include a reflective coating (or reflector). Thus, in some embodiments, the light captured by the plurality of lenses may pass through a first surface (e.g., surface Prism S1 in FIG. 1) of the prism to enter the prism, as indicated by block 710. In some embodiments, at least some of the light passing through the first surface may arrive at a second surface (e.g., surface Prism S2) of the prism and may be reflected at the second surface, as indicated by block 715. In some embodiments, at least some of the light reflected from the second surface may bounce back to the first surface. As described above, when the incident angle of the light is close to or greater than a critical angle of the prism, TIR may occur and the light may be further reflected at the first surface of the prism, as indicated by block 720. In some embodiments, at least some of the light reflected from the first surface of the prism may transmit to and be reflected at a third surface (e.g., surface Prism S3) of the prism, as indicated by block 725. Similarly, when the incident angle of the light is close to or greater than the critical angle, the light may be reflected at the third surface of the prism, as indicated by block 725. In some embodiments, at least some of the light reflected from the third surface may reach and get reflected at a fourth surface (e.g., surface Prism S4) of the prism to exit the prism to the image sensor, as indicated by block 730. In some embodiments, the image sensor may detect the light and accordingly generate image signals, e.g., electrical signals, based on which images may be created, as indicated by block 735.

Figure 8:
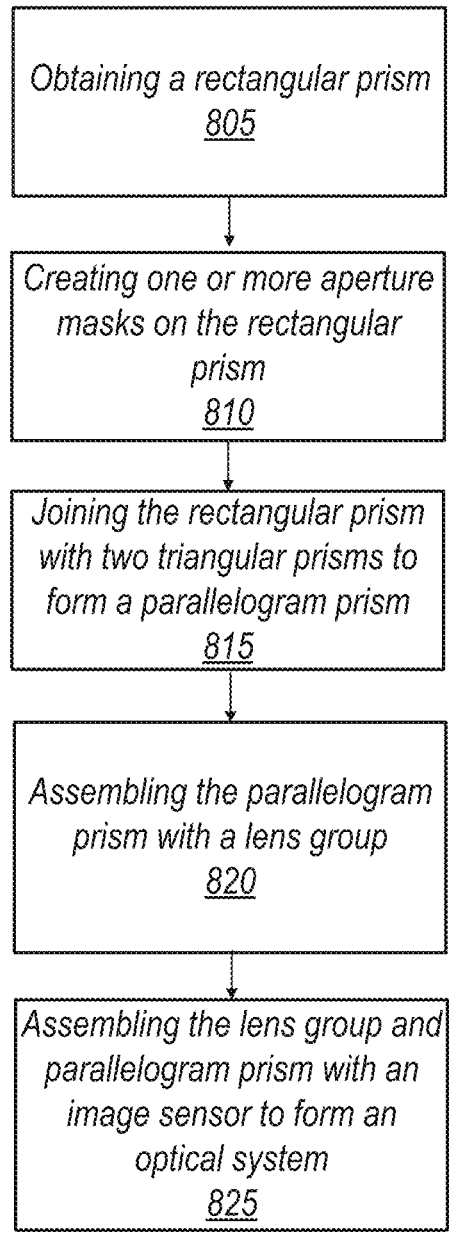
FIG. 8 shows a high-level flowchart of an example method for creating an optical system, according to some embodiments.

FIG. 8 shows a high-level flowchart of an example method for creating an optical system, according to some embodiments. FIG. 8 uses a parallelogram prism as the example for purposes of illustration, and the disclosed method may apply to prism(s) in other shapes and/or sizes as well. As shown in FIG. 8, the method may include obtaining a rectangular prism (e.g., rectangular prism 340 in FIGS. 3B-3C), as indicated by block 805. In some embodiments, one or more aperture masks (e.g., aperture masks 325 and/or 330) may be created at the rectangular prism to reduce flare, as indicated by block 810. For instance, the aperture masks may be created on two opposite, parallel surfaces of the rectangular prism (as shown in FIGS. 3B-3C). In some embodiments, the rectangular may be joined with one or more other prisms using optical cement, e.g., two triangular prisms (e.g., triangular prisms 345 and 350), to form a parallelogram prism (e.g., parallelogram prism 315), as indicated by block 815. In some embodiments, the aperture masks may be positioned at the joining surfaces between the triangular prism and respective triangular prisms (as shown in FIGS. 3B-3C).

In some embodiments, the parallelogram prism may be assembled with a lens group including a plurality of lenses (e.g., lens group 105 in FIG. 1), as indicated by block 820. For instance, the parallelogram prism and the lens group may be assembled together such that a first surface (e.g., surface Prism S1) of the parallelogram prism may face a rear surface of a last lens (e.g., surface L3S2 of lens 105(3) L3) of the lens group (as shown in FIG. 1). Therefore, light captured by the lens group may pass through the lenses (e.g., from lens 105(1) L1, through lens 105(2) L2, and to lens 105(3) L3) of the lens group and then enter the prism through the first surface of the prism. In some embodiments, the lens group and parallelogram prism may be assembled with an image sensor (e.g., image sensor 115) to form an optical system (e.g., optical system 100), as indicated by block 825. For instance, the lens group and parallelogram prism may be assembled with the image sensor such that a third surface (e.g., surface Prism S1) of the parallelogram prism opposite of (and parallel to) the first surface of the prism may face the image sensor (as shown in FIG. 1). Therefore, the light from the lens group may enter the prism through the first surface, get folded inside the prism multiple times (e.g., at least four times), and pass through the third surface of the prism to the image sensor, as described above. In some embodiments, an infrared filter (e.g., infrared filter 125) may optionally be included between the prism and the image sensor in the optical system to block or prevent at least some infrared light from reaching the image sensor.

Figure 9:
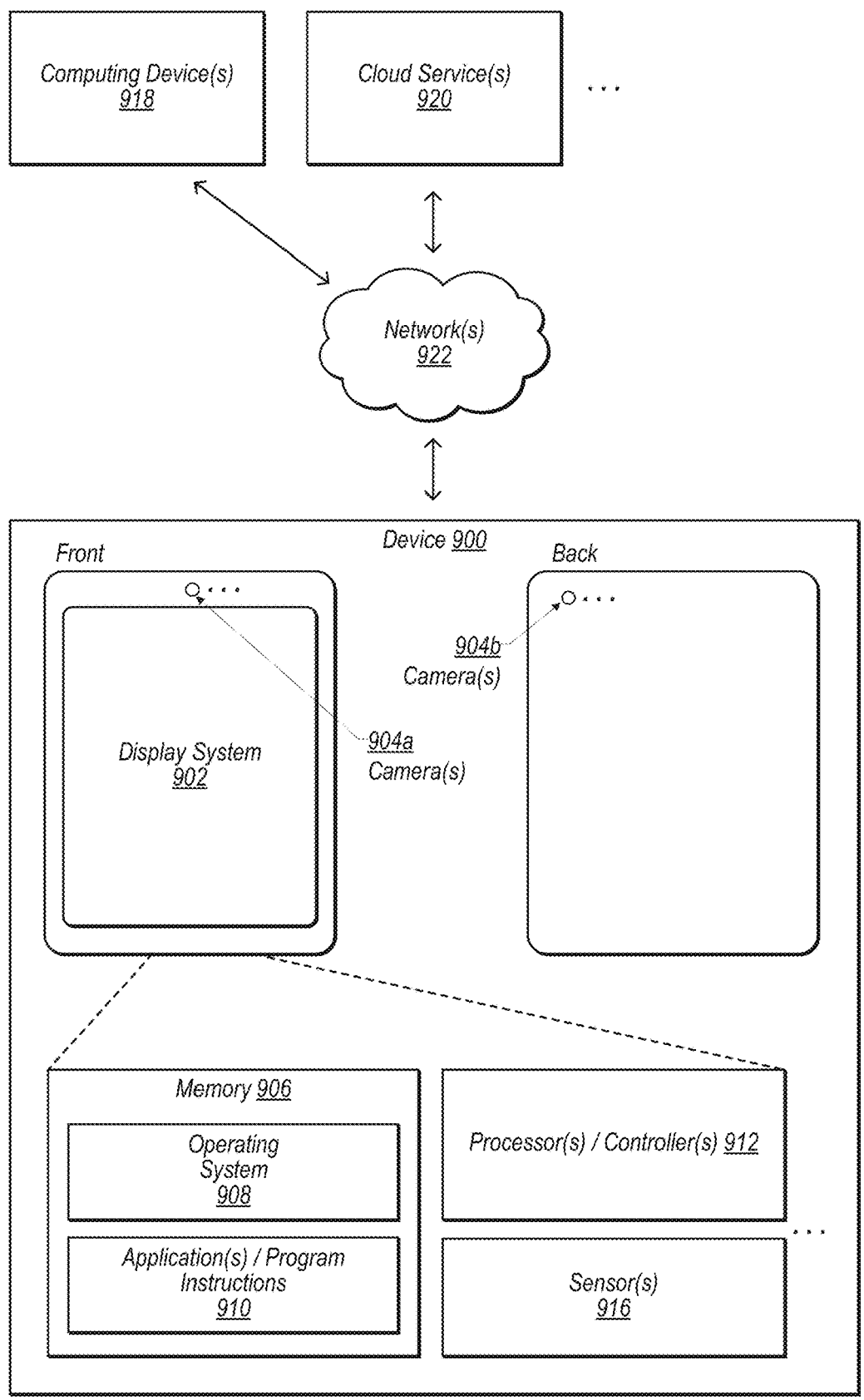
FIG. 9 illustrates a schematic representation of an example device that may include a camera having an optical system, according to some embodiments.

FIG. 9 illustrates a schematic representation of an example device 900 that may include a camera having an optical system (e.g., optical systems 100 in FIGS. 1 and 400a-400h in FIGS. 4A-4H), in accordance with some embodiments. In some embodiments, the device 900 may be a mobile device and/or a multifunction device. In various embodiments, the device 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 900 may include a display system 902 (e.g., comprising a display and/or a touch-sensitive surface) and/or one or more cameras 904. In some non-limiting embodiments, the display system 902 and/or one or more front-facing cameras 904a may be provided at a front side of the device 900, e.g., as indicated in FIG. 9. Additionally, or alternatively, one or more rear-facing cameras 904b may be provided at a rear side of the device 900. In some embodiments comprising multiple cameras 904, some or all of the cameras may be the same as, or similar to, each other. Additionally, or alternatively, some or all of the cameras may be different from each other. In various embodiments, the location(s) and/or arrangement(s) of the camera(s) 904 may be different than those indicated in FIG. 9.

Among other things, the device 900 may include memory 906 (e.g., comprising an operating system 908 and/or application(s)/program instructions 910), one or more processors and/or controllers 912 (e.g., comprising CPU(s), memory controller(s), display controller(s), and/or camera controller(s), etc.), and/or one or more sensors 916 (e.g., orientation sensor(s), proximity sensor(s), and/or position sensor(s), etc.). In some embodiments, the device 900 may communicate with one or more other devices and/or services, such as computing device(s) 918, cloud service(s) 920, etc., via one or more networks 922. For example, the device 900 may include a network interface (e.g., network interface 910) that enables the device 900 to transmit data to, and receive data from, the network(s) 922. Additionally, or alternatively, the device 900 may be capable of communicating with other devices via wireless communication using any of a variety of communications standards, protocols, and/or technologies.

Figure 10:
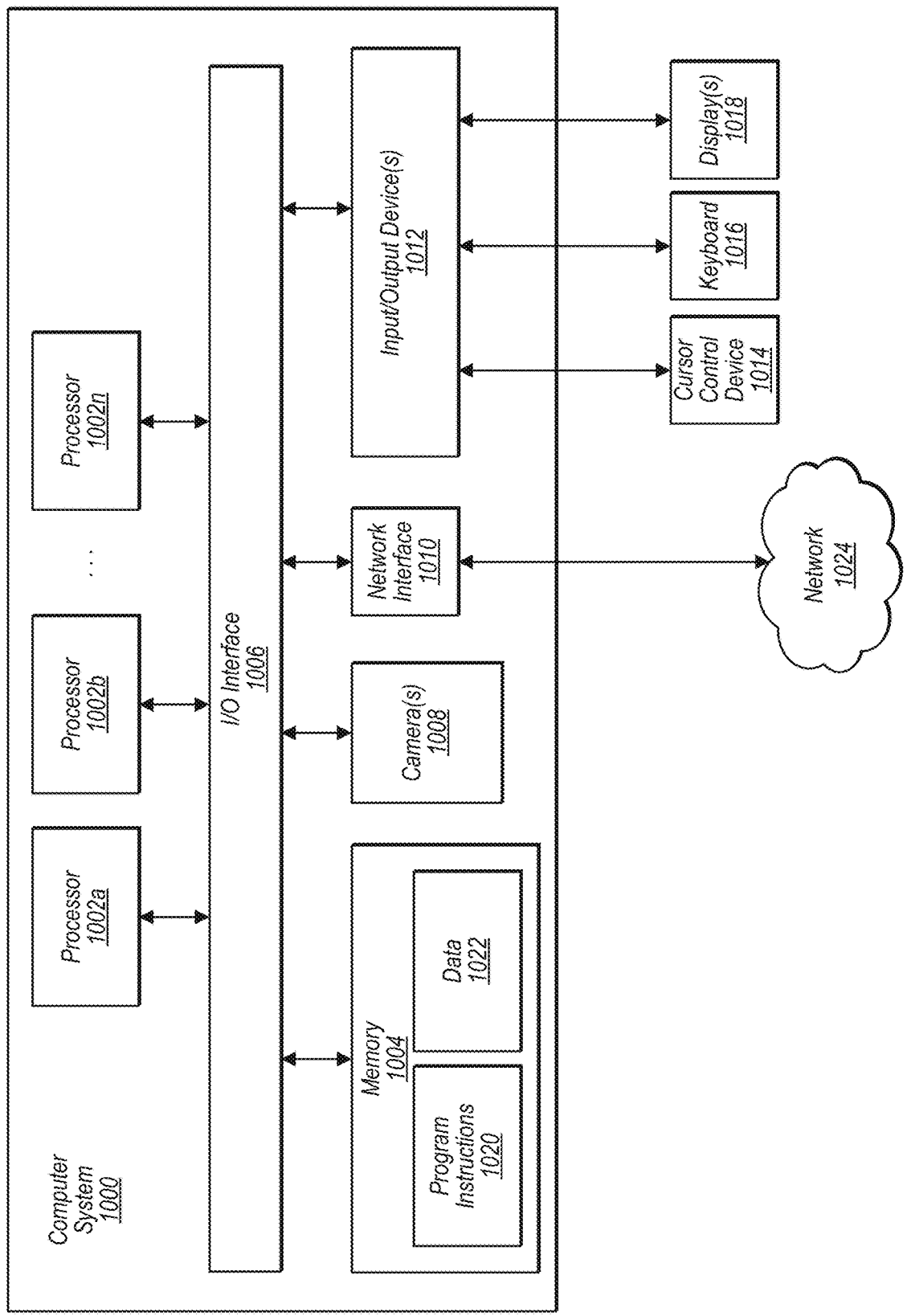
FIG. 10 illustrates a schematic block diagram of an example computer system that may include a camera having an optical system, according to some embodiments.

FIG. 10 illustrates a schematic block diagram of an example computing device, referred to as computer system 1000, that may include or host embodiments of a camera having an optical system, e.g., as described herein with reference to FIGS. 1-9. In addition, computer system 1000 may implement methods for controlling operations of the camera and/or for performing image processing images captured with the camera. In some embodiments, the device 900 (described herein with reference to FIG. 9) may additionally, or alternatively, include some or all of the functional components of the computer system 1000 described herein.

The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1000 includes one or more processors 1002 coupled to a system memory 1004 via an input/output (I/O) interface 1006. Computer system 1000 further includes one or more cameras 1008 coupled to the I/O interface 1006. Computer system 1000 further includes a network interface 1010 coupled to I/O interface 1006, and one or more input/output devices 1012, such as cursor control device 1014, keyboard 1016, and display(s) 1018. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1002, or a multiprocessor system including several processors 1002 (e.g., two, four, eight, or another suitable number). Processors 1002 may be any suitable processor capable of executing instructions. For example, in various embodiments processors 1002 may be general-purpose or embedded processors implementing any of a variety of instruction set architectures (ISAs), such as the x86, PowerPC, SPARC, or MIPS ISAs, or any other suitable ISA. In multiprocessor systems, each of processors 1002 may commonly, but not necessarily, implement the same ISA.

System memory 1004 may be configured to store program instructions 1020 accessible by processor 1002. In various embodiments, system memory 1004 may be implemented using any suitable memory technology, such as static random access memory (SRAM), synchronous dynamic RAM (SDRAM), nonvolatile/Flash-type memory, or any other type of memory. Additionally, existing camera control data 1022 of memory 1004 may include any of the information or data structures described above. In some embodiments, program instructions 1020 and/or data 1022 may be received, sent or stored upon different types of computer-accessible media or on similar media separate from system memory 1004 or computer system 1000. In various embodiments, some or all of the functionality described herein may be implemented via such a computer system 1000.

In one embodiment, I/O interface 1006 may be configured to coordinate I/O traffic between processor 1002, system memory 1004, and any peripheral devices in the device, including network interface 1010 or other peripheral interfaces, such as input/output devices 1012. In some embodiments, I/O interface 1006 may perform any necessary protocol, timing or other data transformations to convert data signals from one component (e.g., system memory 1004) into a format suitable for use by another component (e.g., processor 1002). In some embodiments, I/O interface 1006 may include support for devices attached through various types of peripheral buses, such as a variant of the Peripheral Component Interconnect (PCI) bus standard or the Universal Serial Bus (USB) standard, for example. In some embodiments, the function of I/O interface 1006 may be split into two or more separate components, such as a north bridge and a south bridge, for example. Also, in some embodiments some or all of the functionality of I/O interface 1006, such as an interface to system memory 1004, may be incorporated directly into processor 1002.

Network interface 1010 may be configured to allow data to be exchanged between computer system 1000 and other devices attached to a network 1024 (e.g., carrier or agent devices) or between nodes of computer system 1000. Network 1024 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1010 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1012 may, in some embodiments, include one or more display terminals, keyboards, keypads, touchpads, scanning devices, voice or optical recognition devices, or any other devices suitable for entering or accessing data by one or more computer systems 1000. Multiple input/output devices 1012 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1010.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a plurality of lenses;
   an image sensor; and
   a prism configured to:
     transmit light passing through the plurality of lenses through a first surface into the prism;
     reflect, at a second surface of the prism, at least some of the light passing through the first surface of the prism;
     reflect, at the first surface of the prism, at least some of the light reflected from the second surface of the prism;
     reflect, at a third surface of the prism, at least some of the light reflected from the first surface of the prism; and
     reflect, at a fourth surface of the prism, at least some of the light reflected from the third surface of the prism to pass through the third surface out of the prism to the image sensor,
   wherein a ratio B/A is in a range between 0.2 and 0.6, wherein B represents a partial Z-height of the camera between the first surface of the prism and an image plane of the image sensor, and A represents a total Z-height of the camera between a front surface of a first lens of the plurality of lenses and the image plane of the image sensor.

2. The camera of claim 1, wherein at least one of the second surface or the fourth surface of the prism includes a reflective coating.

3. The camera of claim 1, wherein at least one of the first surface or third surface of the prism includes an anti-reflective coating.

4. The camera of claim 1, wherein the plurality of lenses includes at least one of a glass lens or a plastic lens.

5. The camera of claim 1, wherein individual ones of the plurality of lenses is a spherical lens.

6. The camera of claim 1, wherein the partial Z-height of the camera is in a range between 3.57 and 5.6 millimeters.

7. The camera of claim 1, wherein a product CD is in a range between 0.6 and 1.0, wherein C represents an optical path length of light in the prism from the light entering the prism to exiting the prism, and D represents a power of the plurality of lens.

8. The camera of claim 1, wherein an effective focal path of the camera is in a range of 17.2 and 27.2 millimeters.

9. The camera of claim 1, wherein a ratio E/F is in a range between 0.2 and 0.8, wherein E represents a thickness of the prism between the first surface and the third surface of the prism and F represents a thickness of the plurality of lenses between the front surface of the first lens and a rear surface of a last lens of the plurality of lenses.

10. The camera of claim 1, wherein the prism includes a parallelogram prism, and wherein the first surface of the prism is parallel to the third surface of the prism and the second surface of the prism is parallel to the fourth surface of the prism.

11. The camera of claim 10, wherein an angle between the first surface and second surface of the prism is in a range between 25 and 35 degrees.

12. The camera of claim 1, wherein the prism includes a plurality of prisms joined together using an optical cement.

13. The camera of claim 1, wherein the prism includes one or more aperture masks inside the prism configured to reduce flare.

14. The camera of claim 13, wherein the one or more aperture masks are positioned at respective joining surfaces between a rectangular prism and two triangular prisms.

15. A device, comprising:
   one or more cameras; and
   one or more processors configured to process image signals generated from the one or more cameras,
   wherein at least one of the one or more cameras includes:
     a plurality of lenses;
     an image sensor; and
     a prism configured to:
       transmit light passing through the plurality of lenses through a first surface into the prism;
       reflect, at a second surface of the prism, at least some of the light passing through the first surface of the prism;
       reflect, at the first surface of the prism, at least some of the light reflected from the second surface of the prism;
       reflect, at a third surface of the prism, at least some of the light reflected from the first surface of the prism; and
       reflect, at a fourth surface of the prism, at least some of the light reflected from the third surface of the prism to pass through the third surface out of the prism to the image sensor, wherein a product CD is in a range between 0.6 and 1.0, wherein C represents an optical path length of light in the prism from the light entering the prism to exiting the prism, and D represents a power of the plurality of lens.

16. The device of claim 15, wherein at least one of the second surface or the fourth surface of the prism includes a reflective coating.

17. The device of claim 15, wherein an F-number of the at least one camera is in a range between 2.2 and 2.8, and wherein an effective focal length of the at least one camera is in a range between 17.2 and 27.2 millimeters.

18. The device of claim 15, wherein the prism includes a parallelogram prism, wherein the first surface of the prism is parallel to the third surface of the prism and the second surface of the prism is parallel to the fourth surface of the prism, and wherein an angle between the first surface and the second surface of the prism is between 25 and 35 degrees.

19. An optical system, comprising:
   a plurality of lenses; and
   a prism having at least four surfaces, wherein the prism is configured to:
      transmit light passing through the plurality of lenses through a first surface into the prism;
      reflect, at a second surface of the prism, at least some of the light passing through the first surface of the prism;
      reflect, at the first surface of the prism, at least some of the light reflected from the second surface of the prism;
      reflect, at a third surface of the prism, at least some of the light reflected from the first surface of the prism; and
      reflect, at a fourth surface of the prism, at least some of the light reflected from the third surface of the prism to pass through the third surface out of the prism to an image plane,
   wherein a ratio E/F is in a range between 0.2 and 0.8, wherein E represents a thickness of the prism between the first surface and the third surface of the prism, and F represents a thickness of the plurality of lenses between a front surface of a first lens and a rear surface of a last lens of the plurality of lenses.

* * * * *